US010100939B2

(12) United States Patent
Ichiki et al.

(10) Patent No.: US 10,100,939 B2
(45) Date of Patent: Oct. 16, 2018

(54) VALVE, FLUID CONTROL STRUCTURE, FLUID DEVICE AND METHOD OF MANUFACTURING VALVE

(71) Applicants: The University of Tokyo, Bunkyo-ku, Tokyo (JP); Nikon Corporation, Minato-ku, Tokyo (JP)

(72) Inventors: Takanori Ichiki, Tokyo (JP); Masashi Kobayashi, Tokyo (JP); Shotaro Terane, Tokyo (JP); Kuno Suzuki, Iruma-gun (JP)

(73) Assignees: THE UNIVERSITY OF TOKYO, Tokyo (JP); NIKON CORPORATION, Tokyo (JP)

( * ) Notice: Subject to any disclaimer, the term of this patent is extended or adjusted under 35 U.S.C. 154(b) by 55 days.

(21) Appl. No.: 15/172,453

(22) Filed: Jun. 3, 2016

(65) Prior Publication Data
US 2016/0319944 A1  Nov. 3, 2016

Related U.S. Application Data

(63) Continuation of application No. PCT/JP2014/082283, filed on Dec. 5, 2014.

(30) Foreign Application Priority Data

Dec. 6, 2013 (JP) ................. 2013-253641

(51) Int. Cl.
*B01L 99/00* (2010.01)
*B01L 3/00* (2006.01)
(Continued)

(52) U.S. Cl.
CPC .............. *F16K 7/12* (2013.01); *B23P 15/001* (2013.01); *F04B 43/021* (2013.01); *F16K 7/126* (2013.01);
(Continued)

(58) Field of Classification Search
CPC .............. B01L 99/00; B01L 3/00; F16K 3/00
(Continued)

(56) References Cited

U.S. PATENT DOCUMENTS 6,007,046 A    12/1999 Rothermel
6,527,003 B1 *  3/2003 Webster ................. F15C 5/00
                                                137/15.18
(Continued)

FOREIGN PATENT DOCUMENTS

DE       19949912 A1    5/2001
DE   102008048064 A1    4/2010
(Continued)

OTHER PUBLICATIONS

EPO Communication and Supplementary European Search Report dated Jun. 13, 2017 for European Application No. 14868082.0, 8 pages.
(Continued)

*Primary Examiner* — Brian J. Sines
(74) *Attorney, Agent, or Firm* — Squire Patton Boggs (US) LLP

(57) ABSTRACT

A valve disposed at a flow path includes: a substrate having a first surface in which a hole having an opening section is formed; and a diaphragm member fixed to at least part of a wall surface of the hole and in which at least a central portion has a thin film shape, wherein a flow of a fluid in the flow path is controlled by deforming the diaphragm member.

17 Claims, 26 Drawing Sheets

(51) Int. Cl.
    *F16K 7/12*             (2006.01)
    *F16K 7/17*             (2006.01)
    *B23P 15/00*           (2006.01)
    *F04B 43/02*           (2006.01)
    *F16K 99/00*          (2006.01)

(52) U.S. Cl.
    CPC ............ *F16K 7/17* (2013.01); *F16K 99/0015* (2013.01); *F16K 99/0059* (2013.01); *F16K 2099/0078* (2013.01); *F16K 2099/0094* (2013.01)

(58) Field of Classification Search
    USPC ............... 422/537, 502, 503, 504, 505, 509; 436/180
    See application file for complete search history.

(56) References Cited

U.S. PATENT DOCUMENTS

| | | | |
|---|---|---|---|
| 2004/0148777 A1 | 8/2004 | Sjolander et al. | |
| 2004/0262562 A1* | 12/2004 | Maula | F16K 7/14 251/331 |
| 2006/0076068 A1* | 4/2006 | Young | B01F 5/0683 137/829 |
| 2009/0129981 A1* | 5/2009 | Tokita | B01J 19/0093 422/68.1 |
| 2009/0220944 A1 | 9/2009 | Fais et al. | |
| 2009/0221073 A1* | 9/2009 | Toner | B01L 3/502738 435/378 |
| 2010/0184046 A1 | 7/2010 | Klass et al. | |
| 2011/0041935 A1 | 2/2011 | Zhou et al. | |
| 2011/0126911 A1* | 6/2011 | Kobrin | B01F 11/0071 137/1 |
| 2012/0279638 A1* | 11/2012 | Zhou | B01F 5/0683 156/196 |
| 2012/0302946 A1* | 11/2012 | Rubel | F04B 19/006 604/67 |
| 2014/0246618 A1* | 9/2014 | Zhou | B01F 5/0683 251/331 |
| 2015/0098864 A1* | 4/2015 | Yang | B01L 3/5025 422/69 |
| 2017/0151560 A1* | 6/2017 | Zhou | B01L 3/50273 |

FOREIGN PATENT DOCUMENTS

| | | |
|---|---|---|
| EP | 1905514 A1 | 4/2008 |
| JP | A-2002-508491 | 3/2002 |
| JP | A-2008-106889 | 5/2008 |
| JP | A-2009-510337 | 3/2009 |
| JP | A-2011-510309 | 3/2011 |
| JP | A-2012-508577 | 4/2012 |
| WO | WO 99/31419 A1 | 6/1999 |
| WO | WO 2007/064404 A2 | 6/2007 |
| WO | WO 2009/092386 A2 | 7/2009 |
| WO | WO 2010/056337 A2 | 5/2010 |
| WO | WO 2011/073784 A1 | 6/2011 |

OTHER PUBLICATIONS

Zhang, W., et al., "PMMA/PDMS valves and pumps for disposable microfluidics." Lab Chip Nov. 7, 2009; 9:3088-94.

International Search Report, PCT/JP2014/082283, dated Mar. 10, 2015.

Written Opinion, PCT/JP2014/082283, dated Mar. 10, 2015.

EPO Communication dated Apr. 12, 2018 for European Application No. 14868082.0, 5 pages.

* cited by examiner

VALVE, FLUID CONTROL STRUCTURE, FLUID DEVICE AND METHOD OF MANUFACTURING VALVE

CROSS-REFERENCE TO RELATED APPLICATION

This is a Continuation Application of International Application No. PCT/JP2014/082283, filed on Dec. 5, 2014, which claims priority on Japanese Patent Application No. 2013-253641, filed on Dec. 6, 2013. The contents of the aforementioned applications are incorporated herein by reference.

BACKGROUND

Field of the Invention

The present invention relates to a valve, a fluid control structure, a fluid device and a method of manufacturing the valve.

Background

In the related art, as a valve configured to control a flow of a fluid in a flow path formed in a bonded surface between a first substrate and a second substrate that constitute a laminated substrate, a valve including a 3-layered structure in which a resin sheet is sandwiched between interfaces of the first substrate and the second substrate is known ("PMMA/PDMS Valves and Pumps for Disposable Microfluidics." Lab Chip. 2009 Nov. 7; 9 (21): 3088-94, Zhang W et al.).

FIG. 1 shows a cross-section of the valve having the 3-layered structure of the related art. A resin sheet (111) is laminated on the entire upper surface of a first substrate (110), and a second substrate (112) is laminated thereon. A groove is dug into a lower surface of the second substrate (112), the resin sheet (111) is bonded to the lower surface of the second substrate (112) in a shape to cover the groove, and a flow path (114) is formed. An arrow pointing right in FIG. 1 shows that a flow path extends in a rightward direction in the drawing, and a fluid flows in the rightward direction in the drawing. In addition, a through-hole (113) is formed in the first substrate (110). Here, when air is blown to the resin sheet (111) from the inside of the through-hole (113) to apply a pressure, the resin sheet (111) expands upward to close the flow path (114) and prevent a flow of the fluid (see FIG. 2). In addition, when the air pressure is stopped, the resin sheet is returned to its original flat shape by elasticity thereof. According to the above-mentioned pressure control, the resin sheet (111) functions as a diaphragm member of the valve.

SUMMARY

However, for example, when the valve of the 3-layered structure is repeatedly operated, the resin sheet (111) may be gradually exfoliated from an upper surface of the first substrate (110) about the through-hole (113) to deteriorate a response of the valve.

When further use in this state is continued, bonding strength between the first substrate (110) and the second substrate (112) may be weakened to exfoliate both of the substrates.

An object of an aspect of the present invention is directed to providing a valve having good durability, a fluid control structure, a fluid device and a method of manufacturing the valve.

(1) A valve according to an aspect of the present invention is a valve disposed at a flow path, the valve including: a substrate having a first surface in which a hole having an opening section is formed; and a diaphragm member fixed to at least part of a wall surface of the hole and in which at least a central portion has a thin film shape, wherein a flow of a fluid in the flow path is controlled by deforming the diaphragm member.

(2) A fluid control structure according to an aspect of the present invention includes: a substrate having a first surface in contact with a fluid and in which a through-hole is formed; a valve body fitted into an opening section of the first surface of the through-hole, and in which at least a central portion has a thin film shape, and that is elastically deformable; and a driving unit configured to deform the valve body in a direction perpendicular to an axis of the flow path.

(3) A fluid device according to an aspect of the present invention includes the valve according to (1) or the fluid control structure according to (2).

(4) A method of manufacturing a valve according to an aspect of the present invention includes: closing a first end portion of a through-hole opened at a first surface of a substrate using a lid member; injecting a raw material for a diaphragm member from a second end portion of the through-hole; forming the diaphragm member having at least a central portion formed in a thin film shape and fitted into the first end portion of the through-hole by solidifying the raw material; and removing the lid member.

According to an aspect of the present invention, it is possible to provide a valve having good durability, a fluid control structure, a fluid device and a method of manufacturing the valve.

Figure 14:
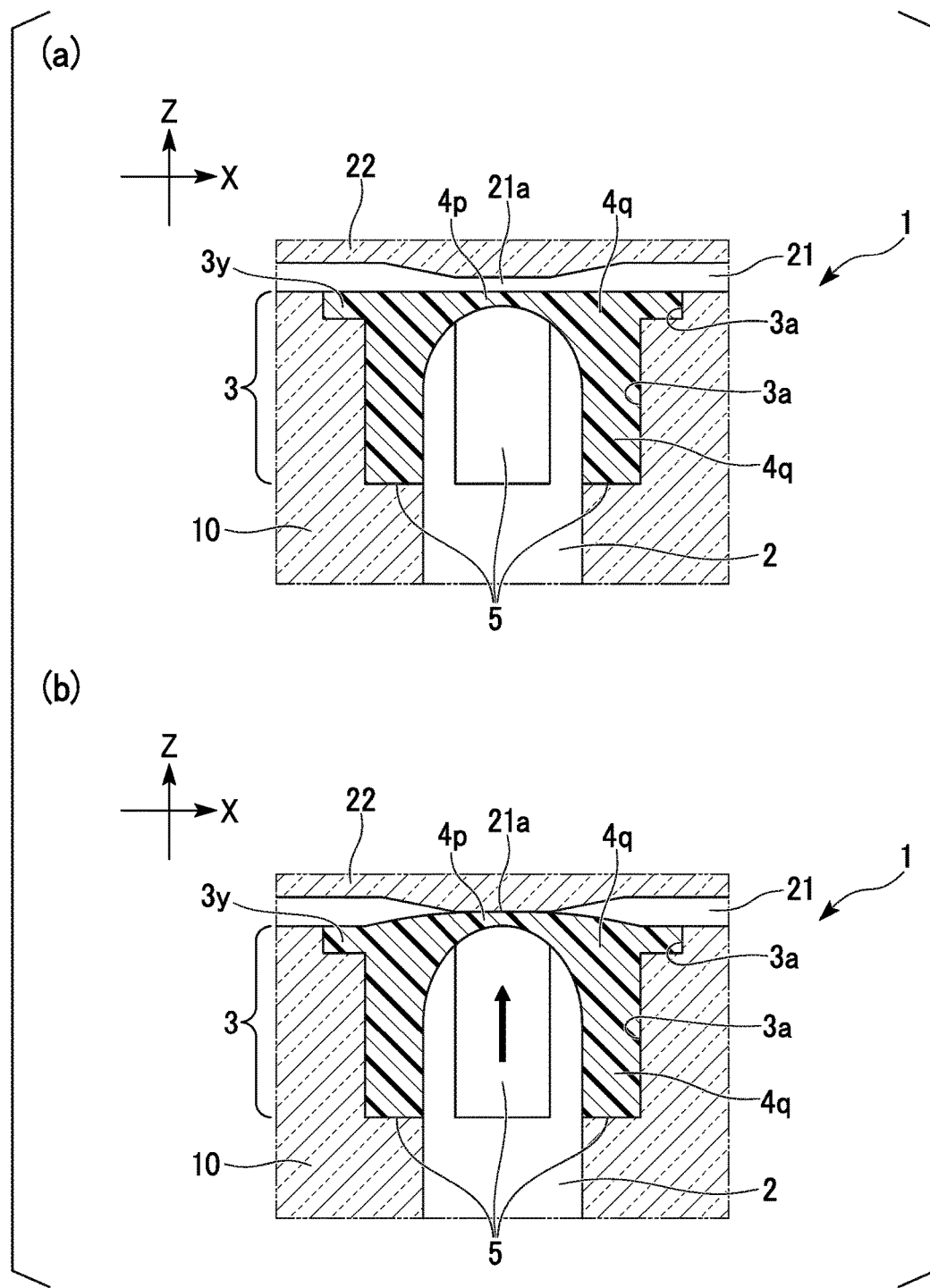

Part (a) of FIG. 14 is a cross-sectional view showing a state in which a flow path is opened immediately over the valve according to the fourth embodiment, and part (b) of FIG. 14 is a cross-sectional view showing a state in which the valve closes the flow path.

Figure 12:
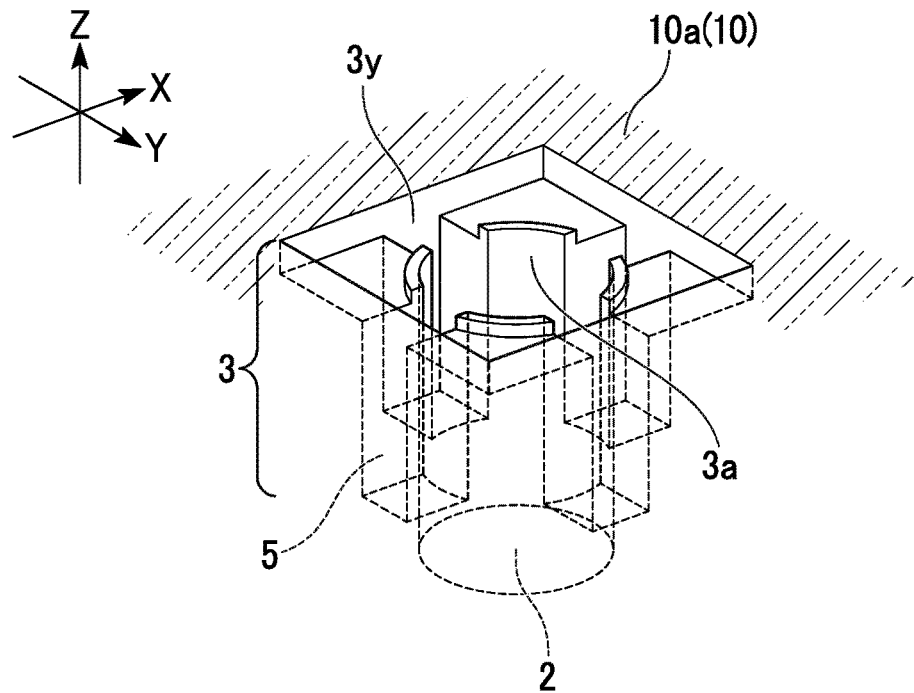
FIG. 12 is a perspective view showing a configuration of a through-hole that constitutes a valve according to a fourth embodiment of the present invention.
Figure 15:
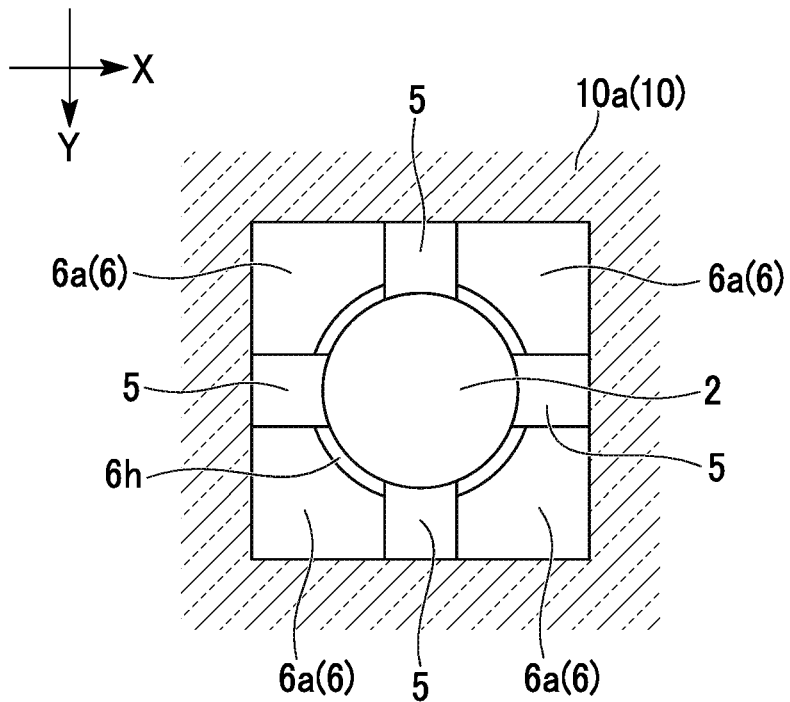

FIG. 15 is a plan view showing the through-hole shown in FIG. 12 from above.

Figure 16:
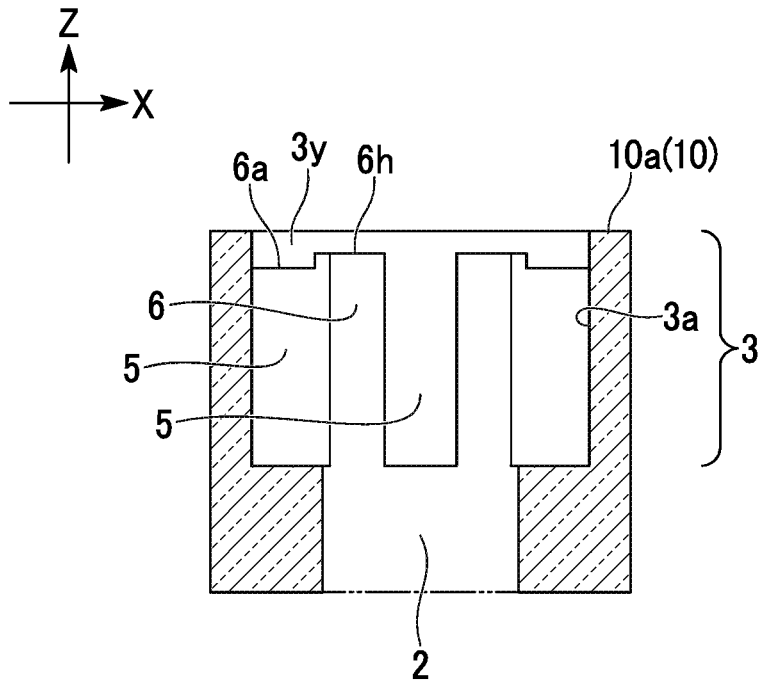

FIG. 16 is a cross-sectional view showing the through-hole shown in FIG. 12 from a side.

Figure 17:
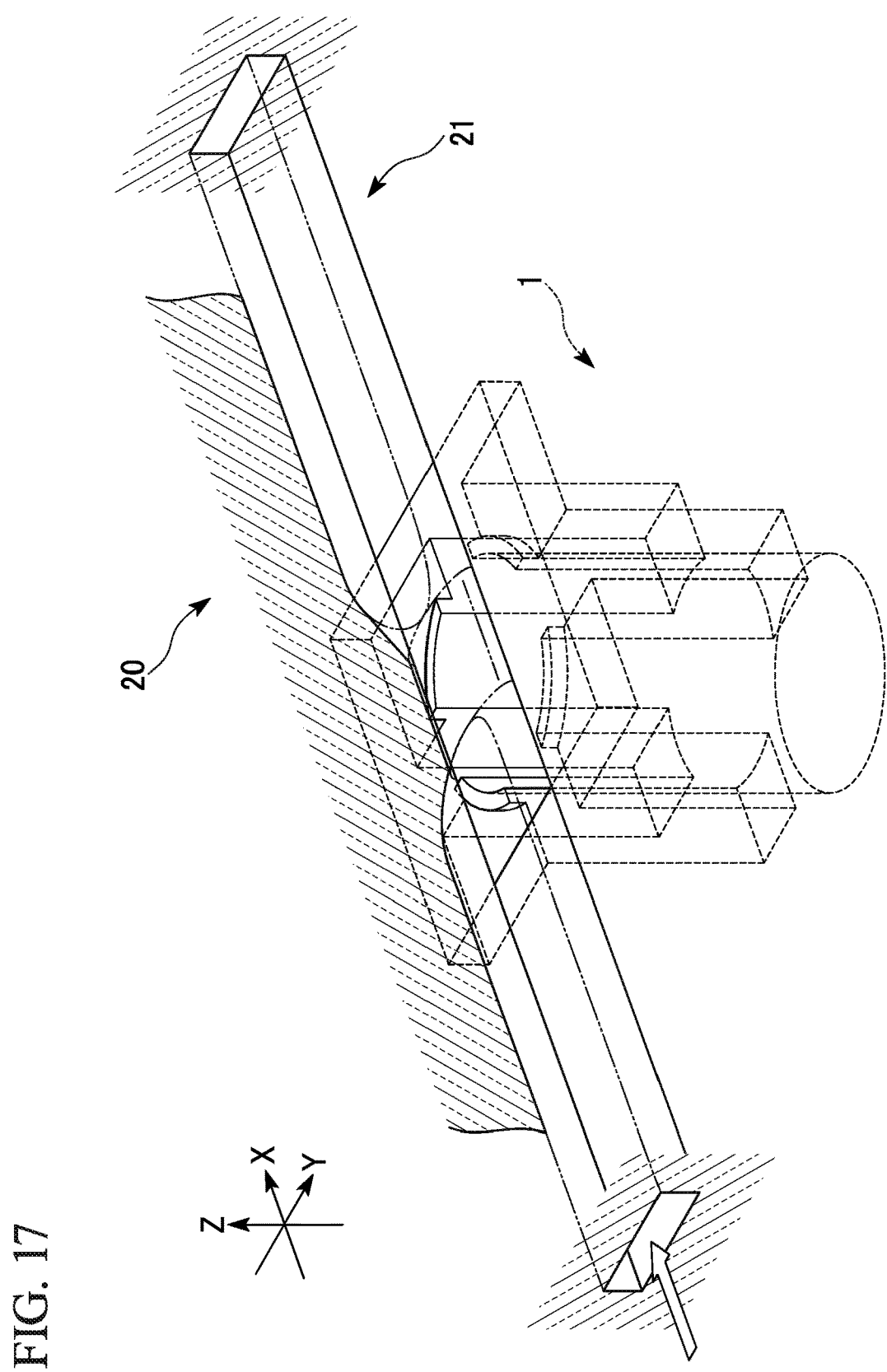

FIG. 17 is a perspective view of a laminated substrate including the valve according to the fourth embodiment.

Figure 18:
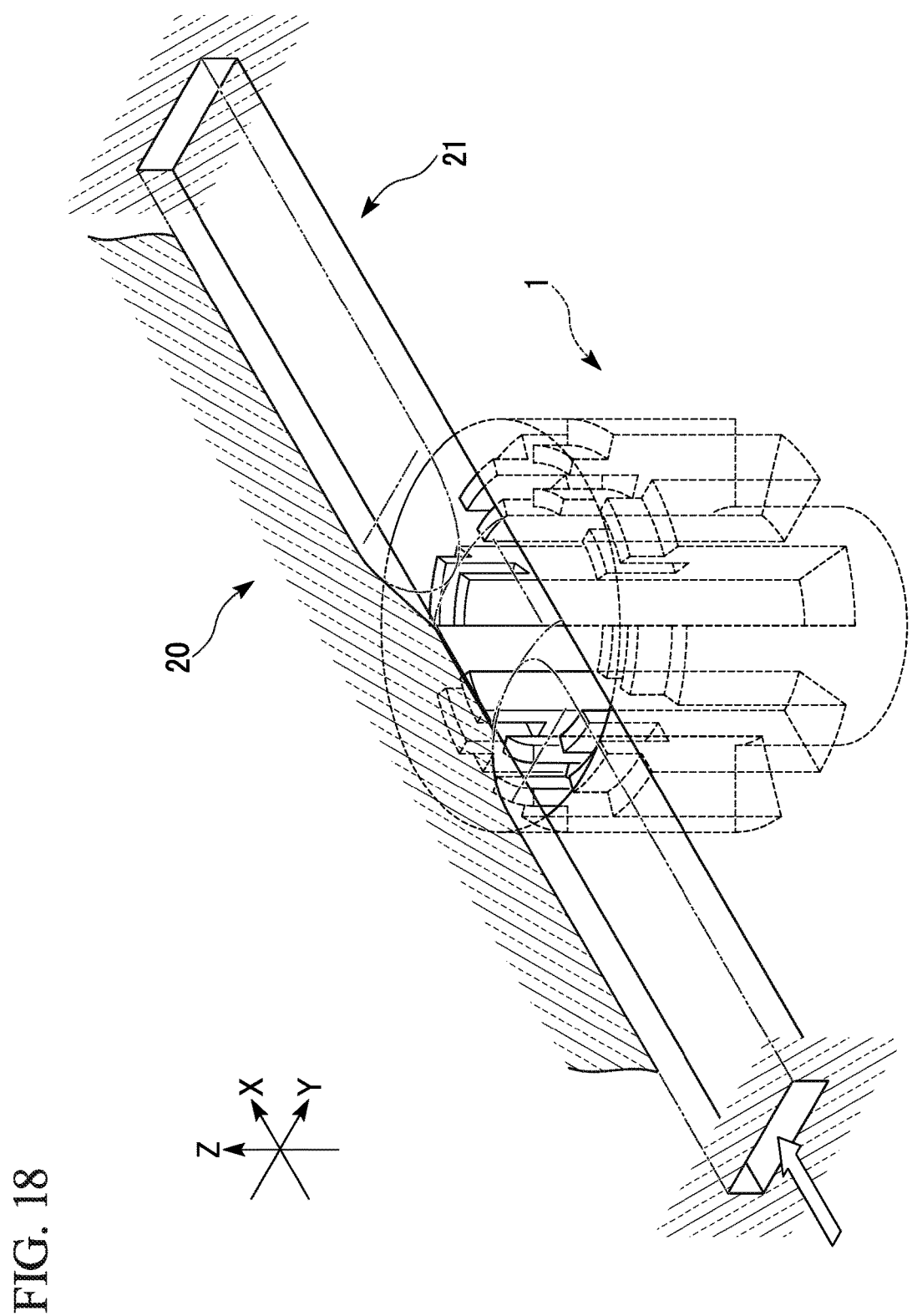

FIG. 18 is a perspective view of a laminated substrate including a valve according to the fifth embodiment of the present invention.

Figure 19:
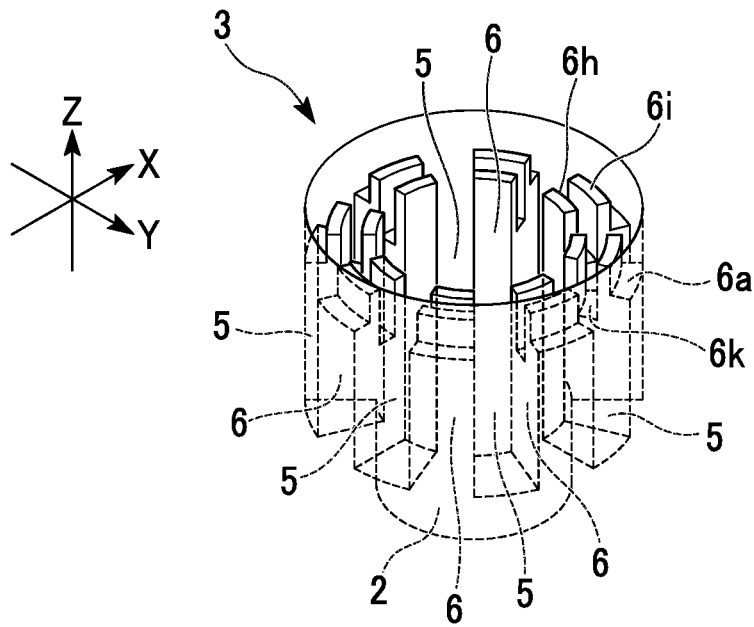

FIG. 19 is a perspective view showing a configuration of a through-hole that constitutes the valve according to the fifth embodiment.

Figure 20:
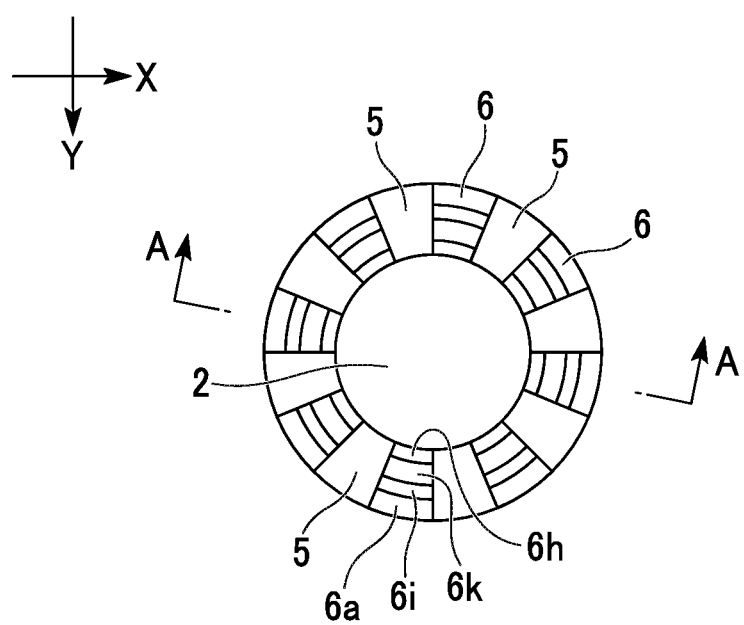

FIG. 20 is a plan view showing the through-hole shown in FIG. 19 from above.

Figure 21:
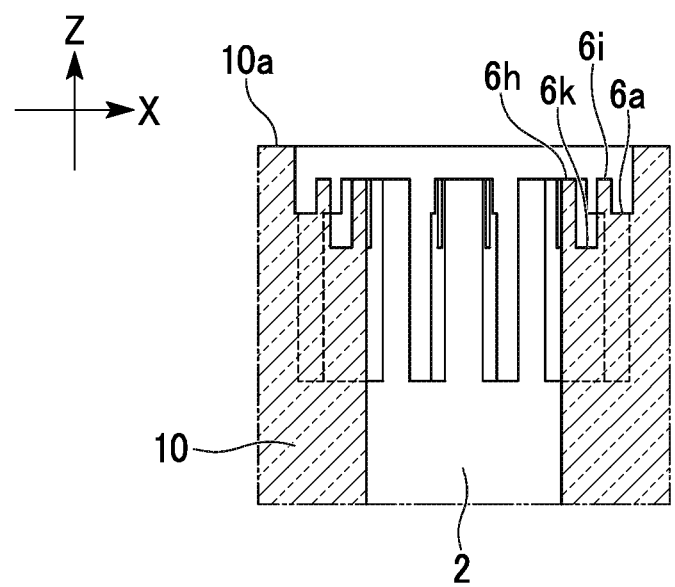

FIG. 21 is a cross-sectional view showing the through-hole shown in FIG. 19 from a side.

Figure 22:
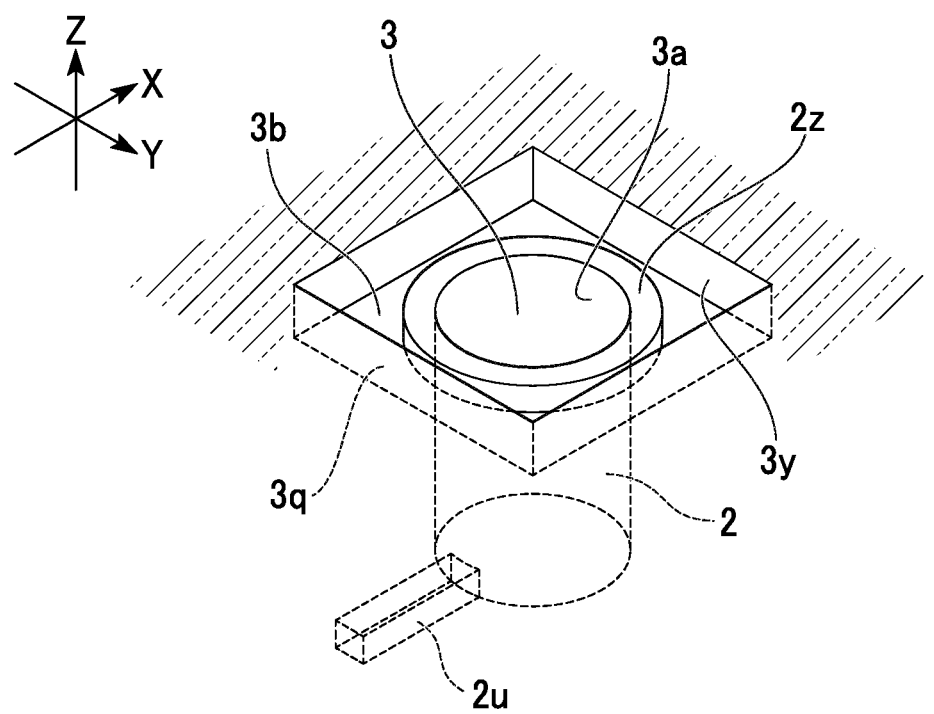

FIG. 22 is a perspective view showing a configuration of a through-hole that constitutes a valve according to a sixth embodiment of the present invention.

Figure 23:
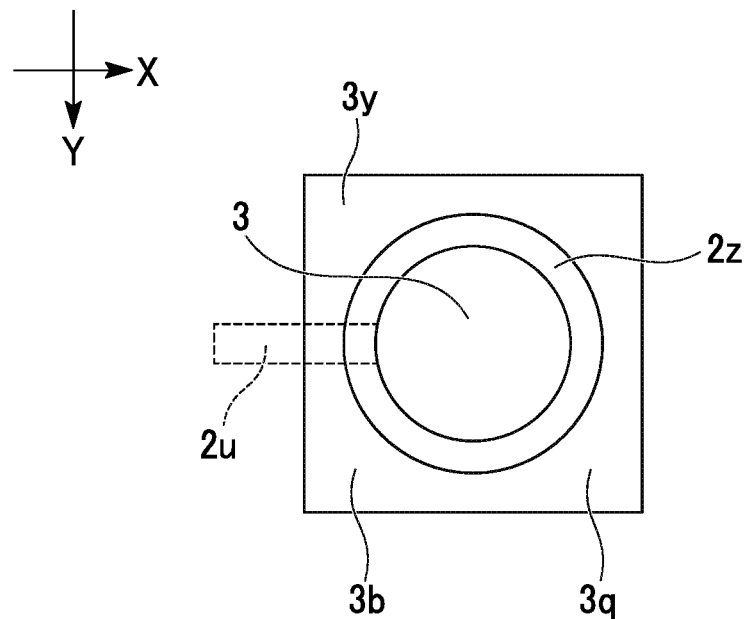

FIG. 23 is a plan view showing the through-hole shown in FIG. 22 from above.

Figure 24:
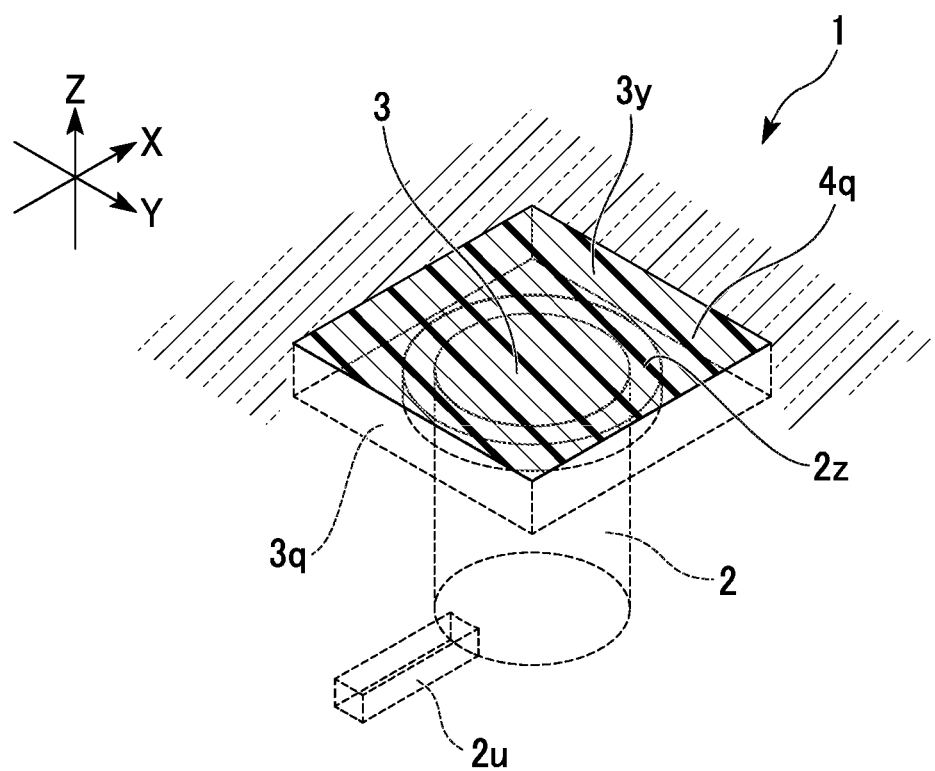

FIG. 24 is a perspective view showing an aspect in which a diaphragm member is disposed in an opening section of the through-hole shown in FIG. 22.

Figure 25:
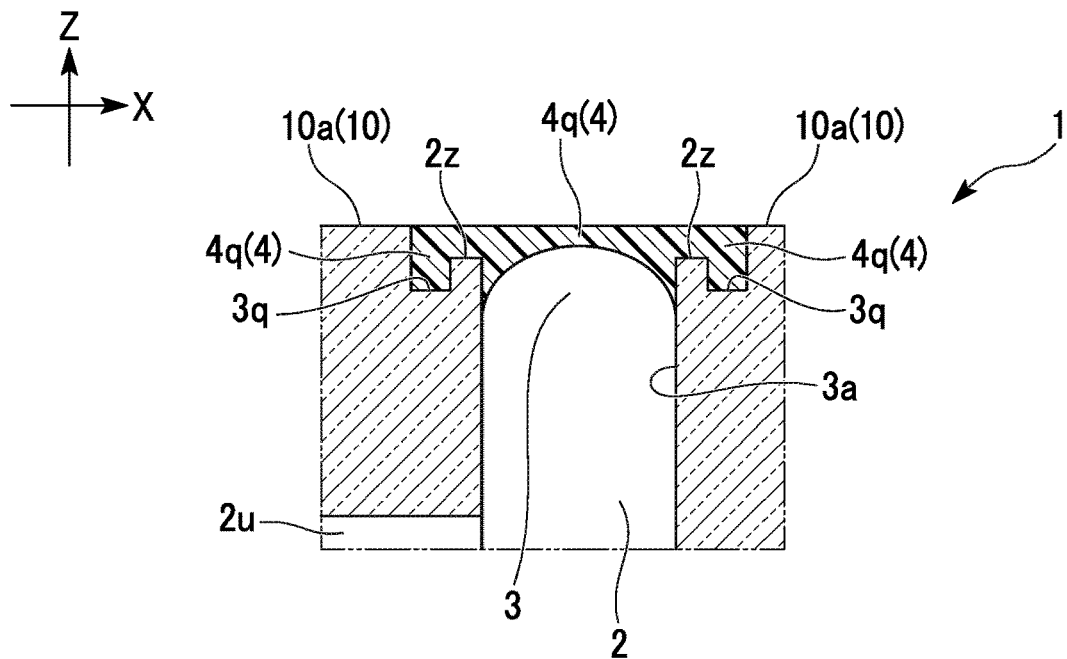

FIG. 25 is a cross-sectional view showing the valve shown in FIG. 24 from a side.

Figure 26:
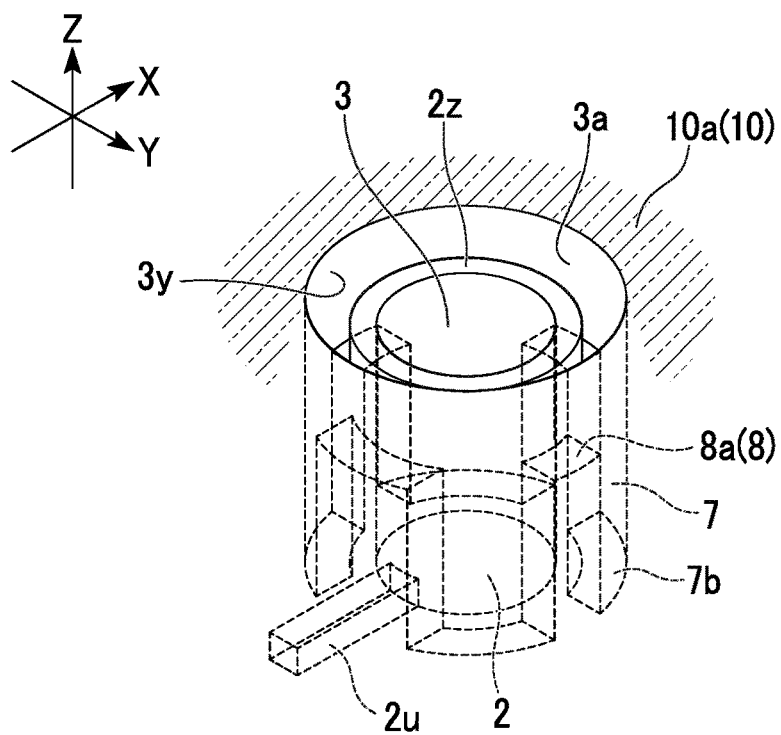

FIG. 26 is a perspective view showing a configuration of a through-hole that constitutes a valve according to a seventh embodiment of the present invention.

Figure 27:
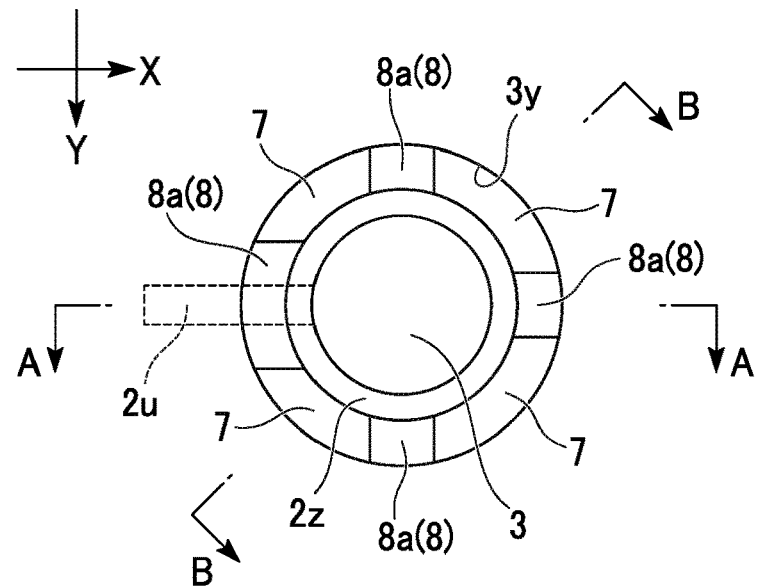

FIG. 27 is a plan view showing the through-hole shown in FIG. 26 from above.

Figure 28:
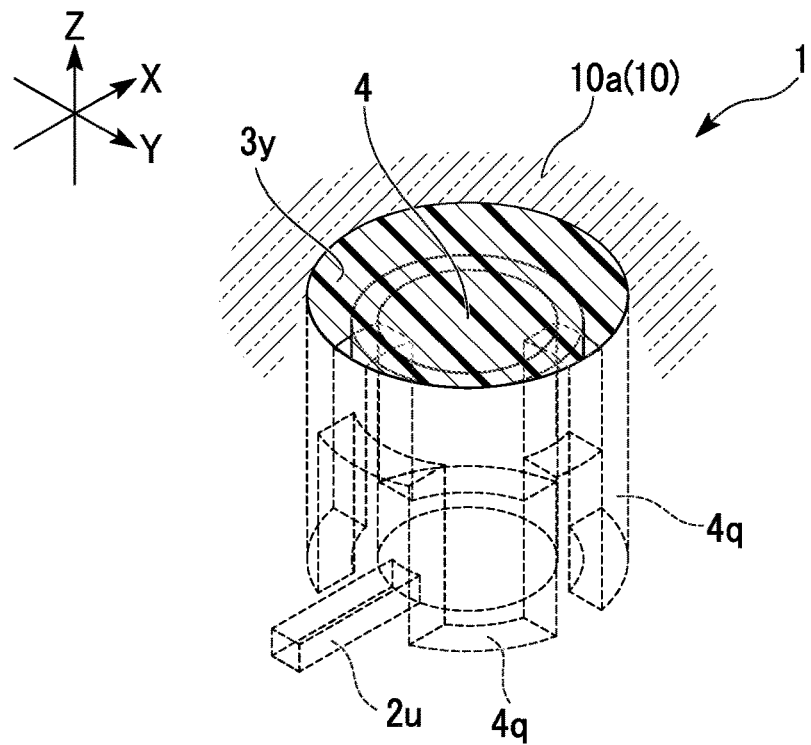

FIG. 28 is a perspective view showing an aspect in which a diaphragm member is disposed in an opening section of the through-hole shown in FIG. 26.

Figure 29:
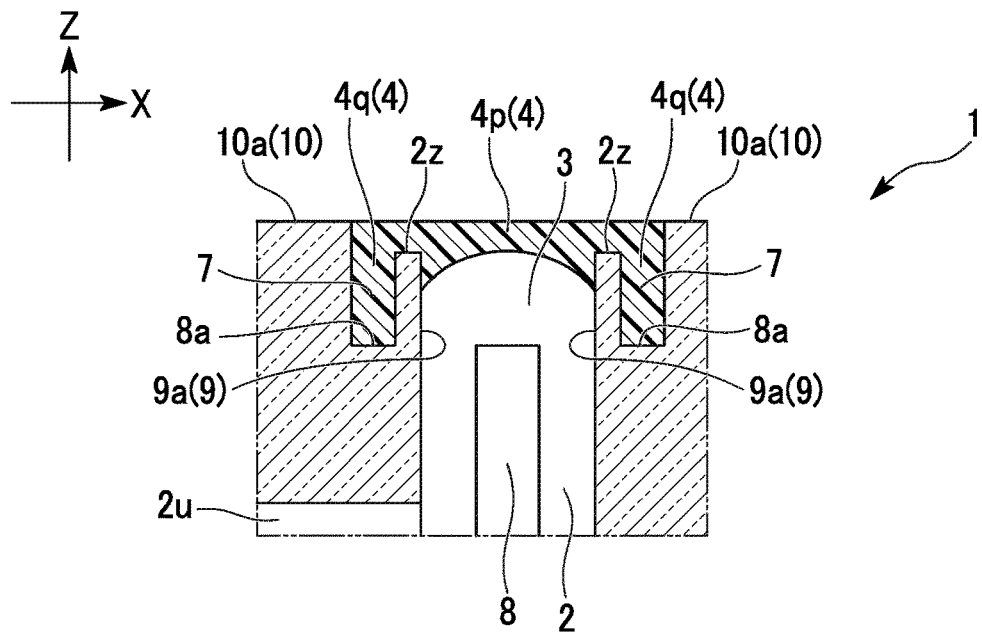

FIG. 29 is a cross-sectional view showing the valve shown in FIG. 28 from a side.

Figure 30:
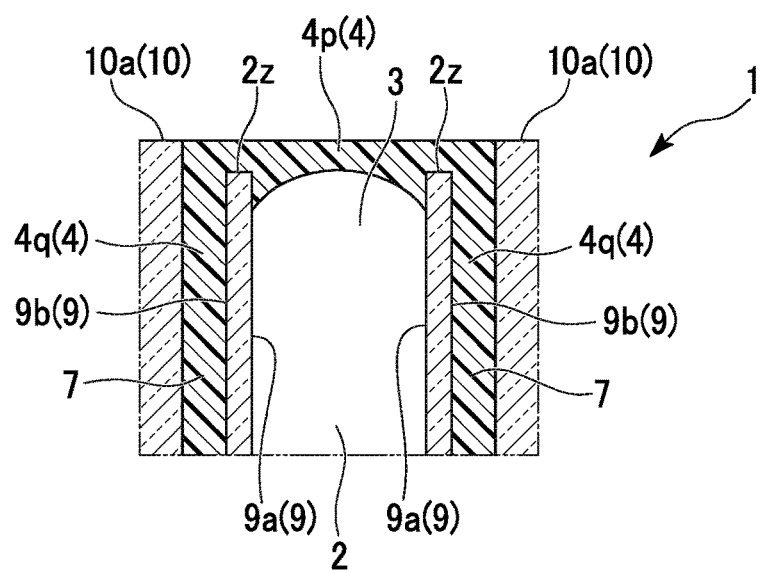

FIG. 30 is a cross-sectional view showing the valve shown in FIG. 28 from a side different from FIG. 29.

Figure 31:
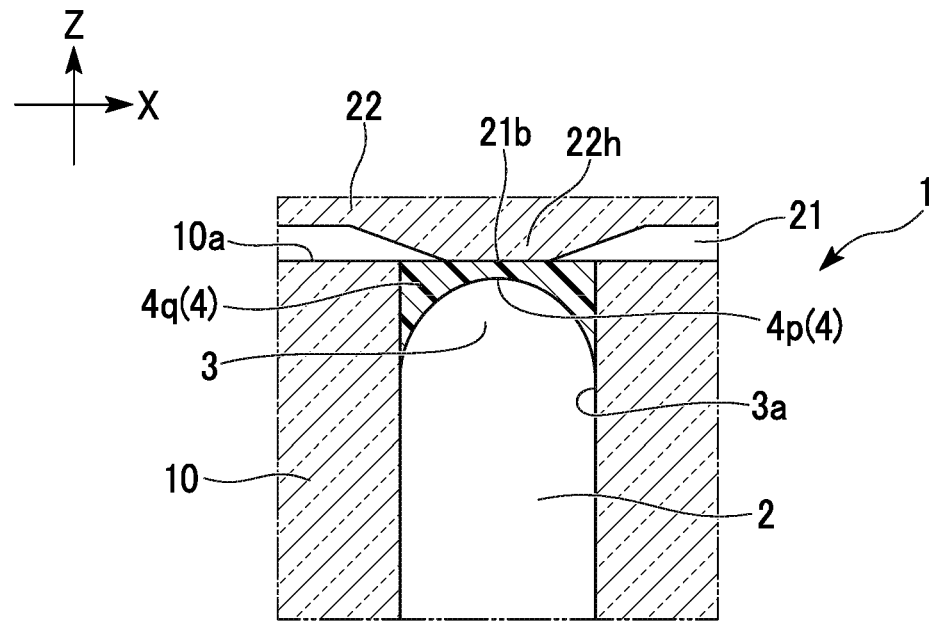

FIG. 31 is a cross-sectional view showing an example of an operating manner of the valve according to the first embodiment.

Figure 32:
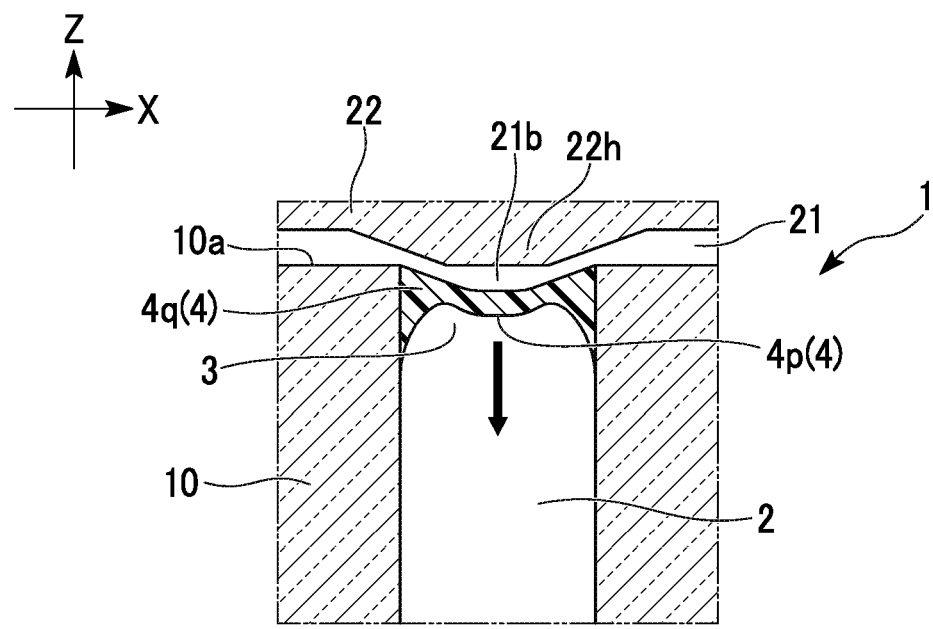

FIG. 32 is a cross-sectional view showing the example of the operating manner of the valve according to the first embodiment.

Figure 33:
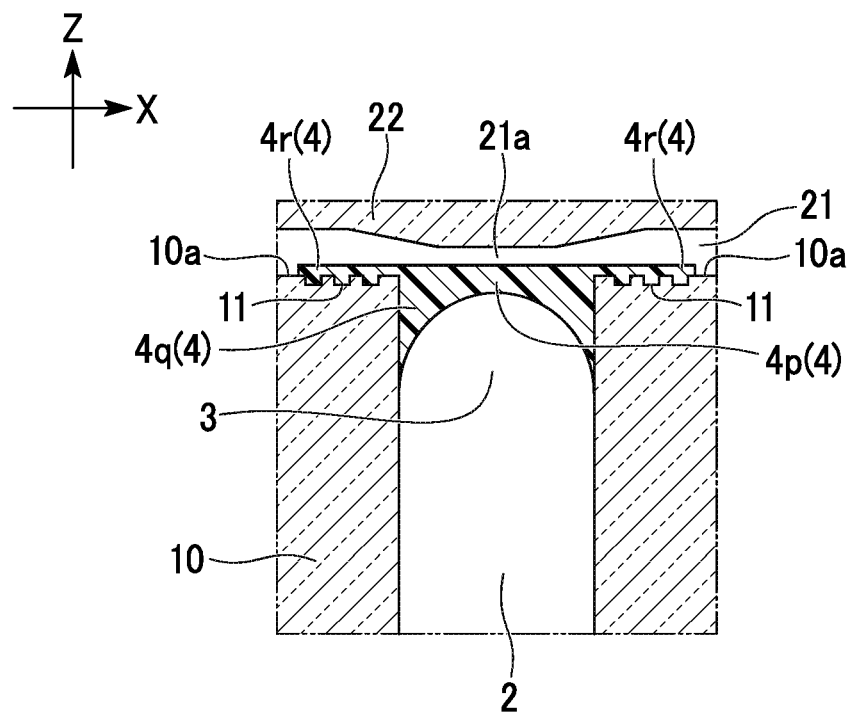

FIG. 33 is a cross-sectional view showing a variant of the valve according to the first embodiment.

Figure 34:
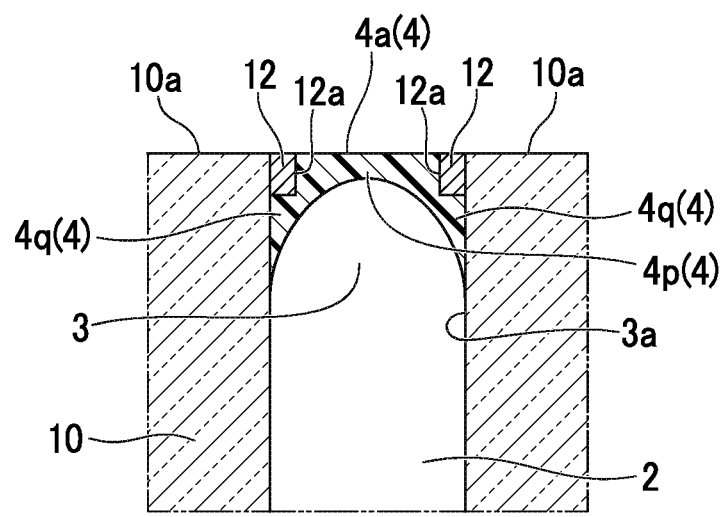

FIG. 34 is a cross-sectional view showing a variant of the valve according to the first embodiment.

Figure 35:
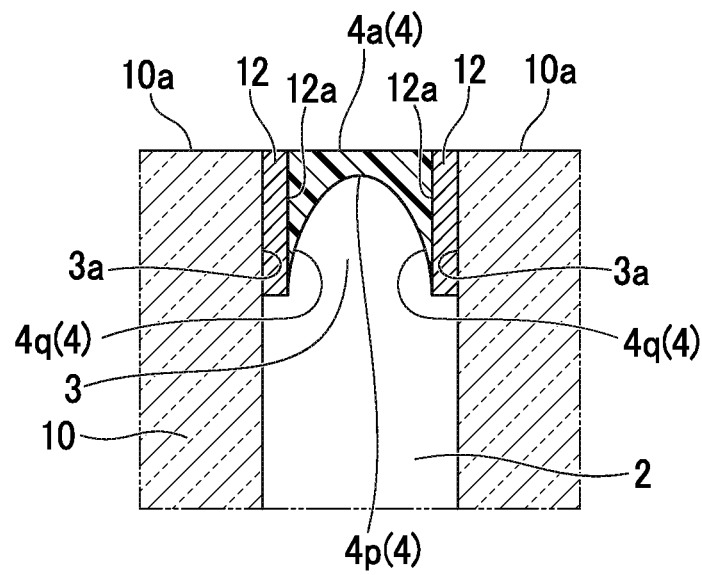

FIG. 35 is a cross-sectional view showing a variant of the valve according to the first embodiment.

Figure 36A:
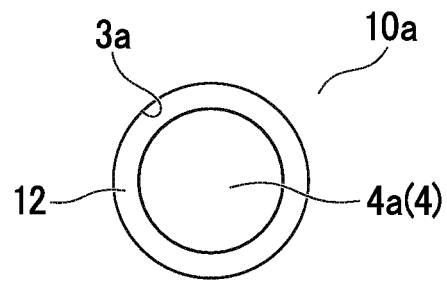

FIG. 36A is a plan view showing a variant of the valve according to the first embodiment.

Figure 36B:
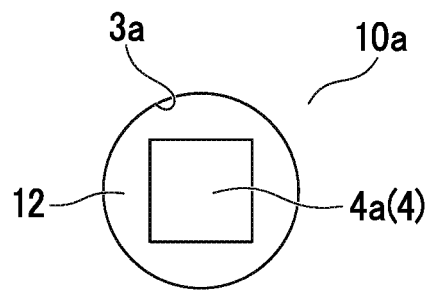

FIG. 36B is a plan view showing a variant of the valve according to the first embodiment.

Figure 37:
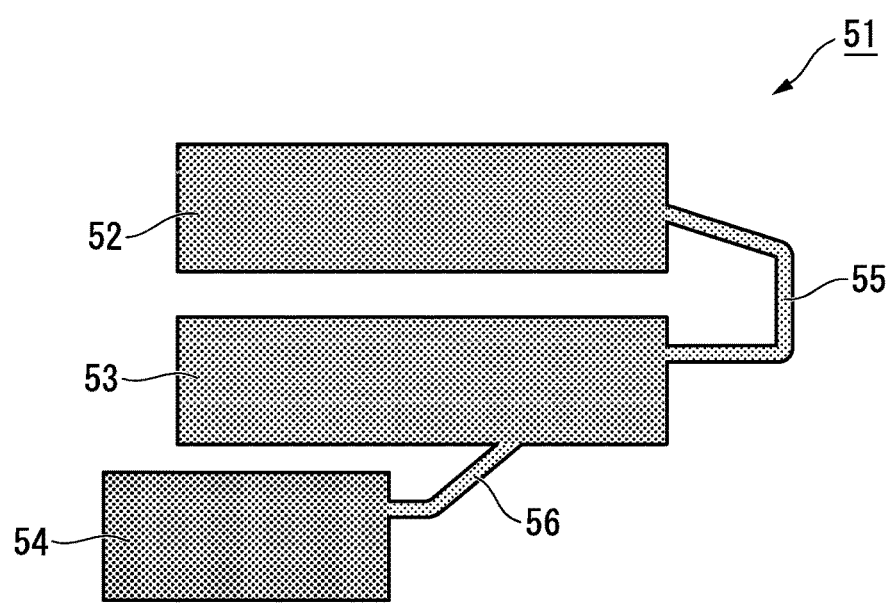

FIG. 37 is a schematic view showing an example of a fluid device according to an embodiment.

Figure 38:
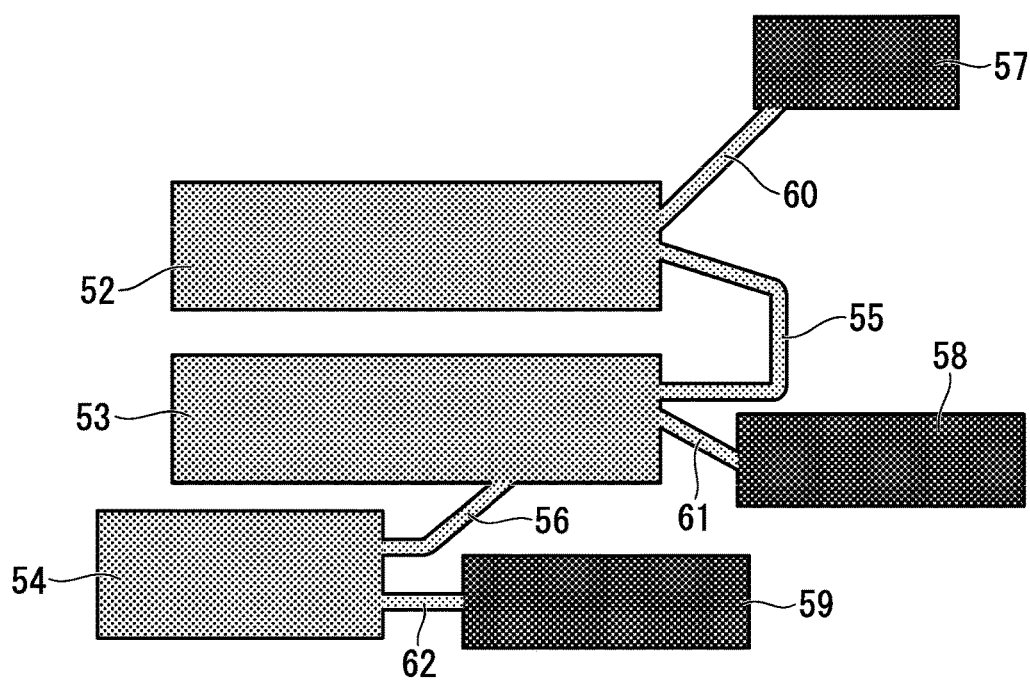

FIG. 38 is a schematic view showing an example of a fluid device according to an embodiment.

Figure 39:
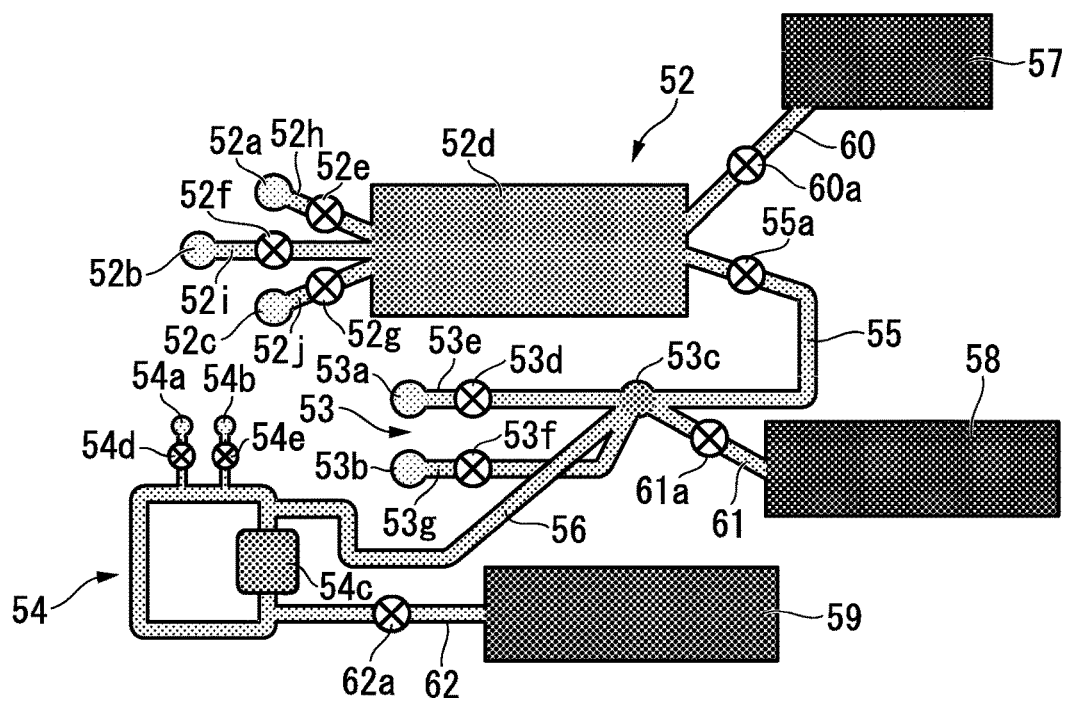

FIG. 39 is a schematic view showing an example of a fluid device according to an embodiment.

Figure 40:
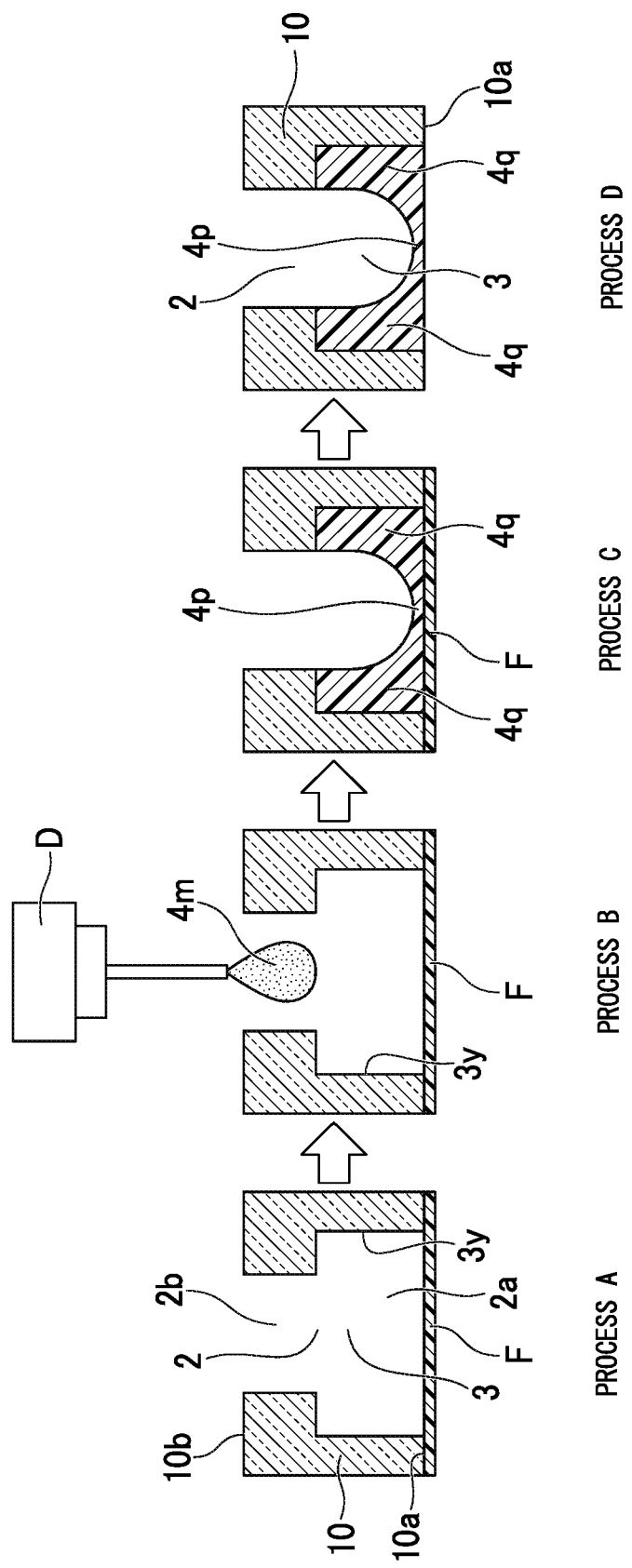

FIG. 40 is a cross-sectional view showing an example of a method of manufacturing a valve according to an embodiment.

Figure 41:
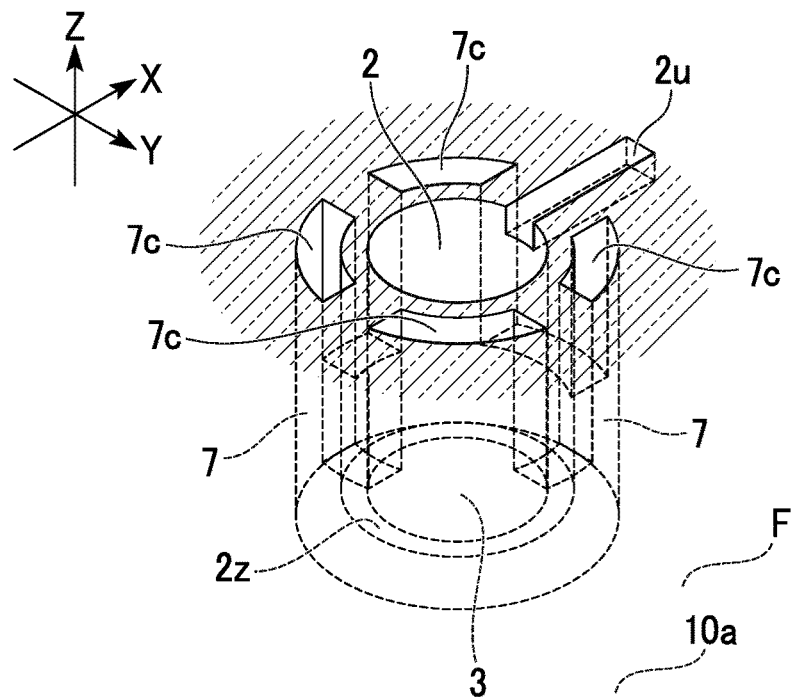

FIG. 41 is a perspective view showing a configuration of a through-hole provided in a substrate used in an example of a method of manufacturing a valve according to an embodiment.

Figure 42:
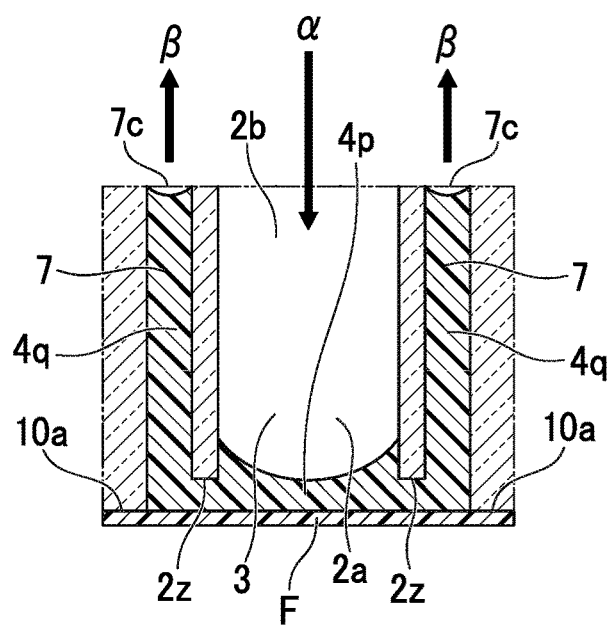

FIG. 42 is a cross-sectional view showing a state in which a raw material of a diaphragm member is injected into the through-hole shown in FIG. 41.

DESCRIPTION OF EMBODIMENTS

Hereinafter, preferable embodiments of a valve serving as a first aspect of the present invention, a fluid control structure serving as a second aspect, a fluid device serving as a third aspect and a method of manufacturing a valve serving as a fourth aspect will be described. Further, in the embodiments, common components are designated by the same reference numerals.

<<Valve Disposed in Flow Path>>

Figure 1:
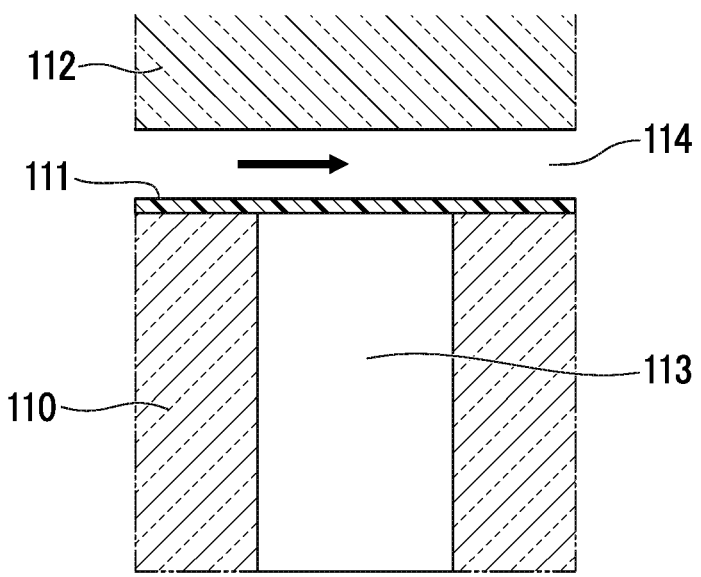
FIG. 1 is a cross-sectional view of a valve having a 3-layered structure of the related art.
Figure 2:
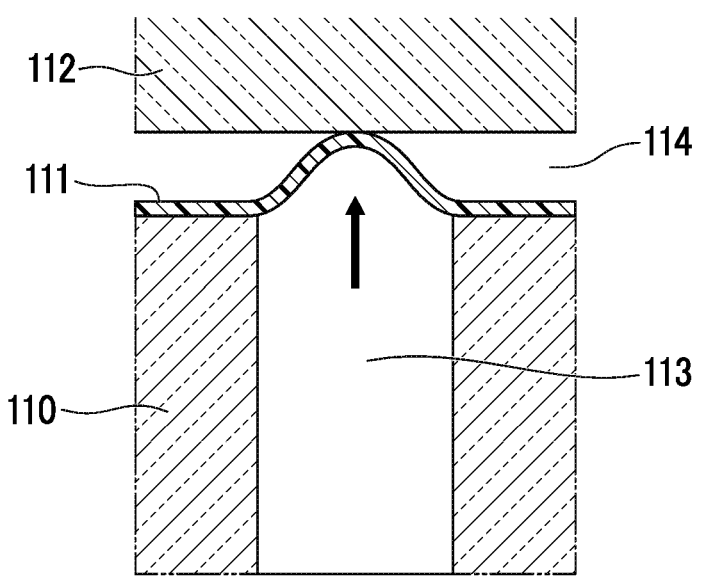
FIG. 2 is a cross-sectional view of the valve having the 3-layered structure of the related art.
Figure 3:
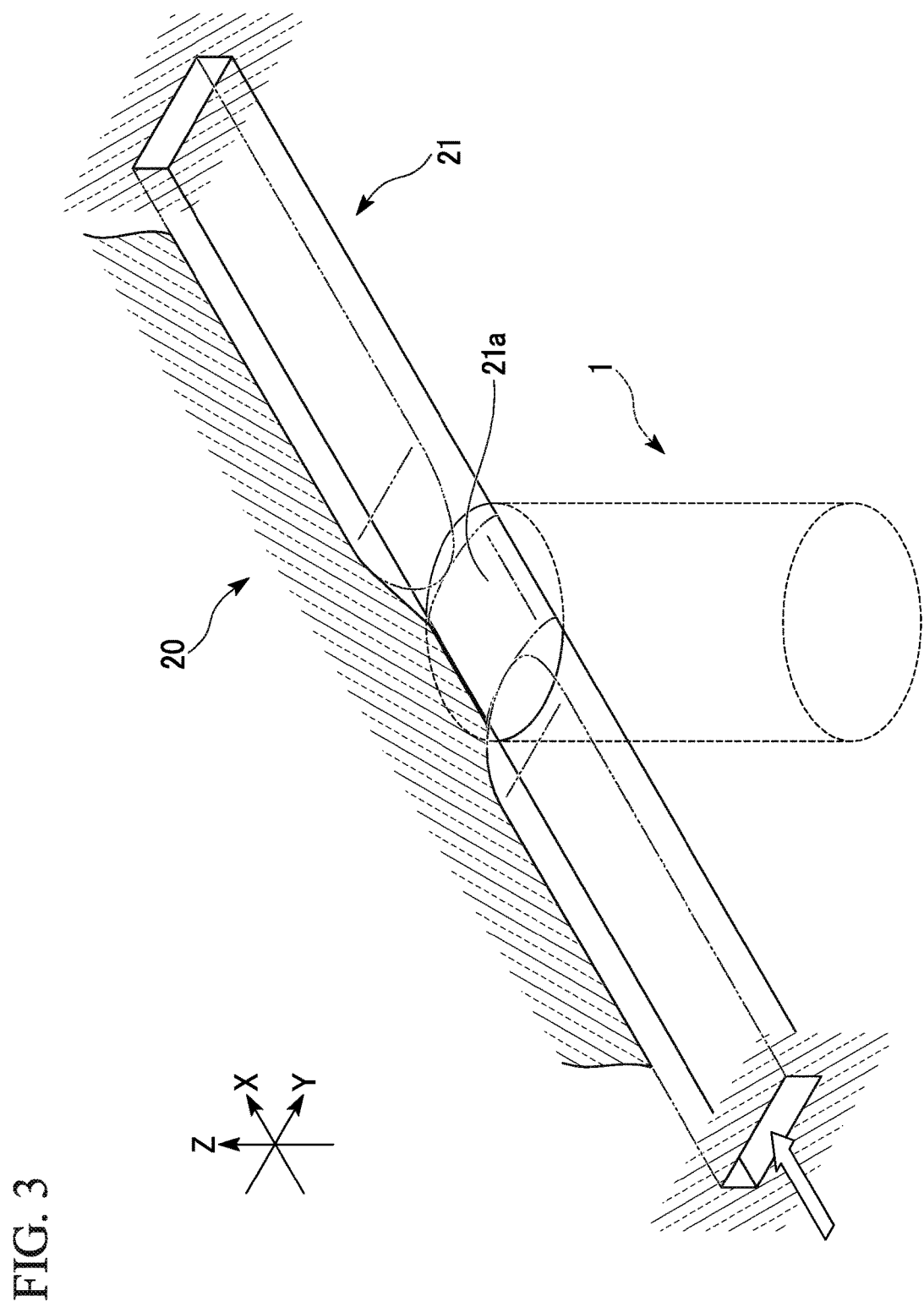
FIG. 3 is a perspective view of a laminated substrate including a valve according to a first embodiment of the present invention.

FIG. 3 is an example of a laminated substrate 20 including a valve according to a first embodiment of the present invention. A fluid such as a liquid, a gas, or the like, flows through a tunnel-shaped flow path 21 formed in the laminated substrate 20 in a positive direction of an X-axis shown by an arrow. A small diameter section 21a having an inner diameter smaller than another portion is formed in the middle of the flow path 21. A valve 1 of the embodiment is disposed at a lower side of the small diameter section 21a of the flow path 21 (in a negative direction of a Z-axis of FIG. 3). Further, the flow path 21 is not an indispensable component of the valve 1 of the embodiment.

<First Embodiment>

A hole that constitutes the valve 1 of the embodiment is a through-hole 2, and a diaphragm member 4 is fixed to one end side (a first end portion side) in the through-hole 2. The hole constitutes a space through which an external force (to be described below) passes from the other end side (a second end portion side) of the through-hole 2 toward the diaphragm member 4.

Figure 4A:
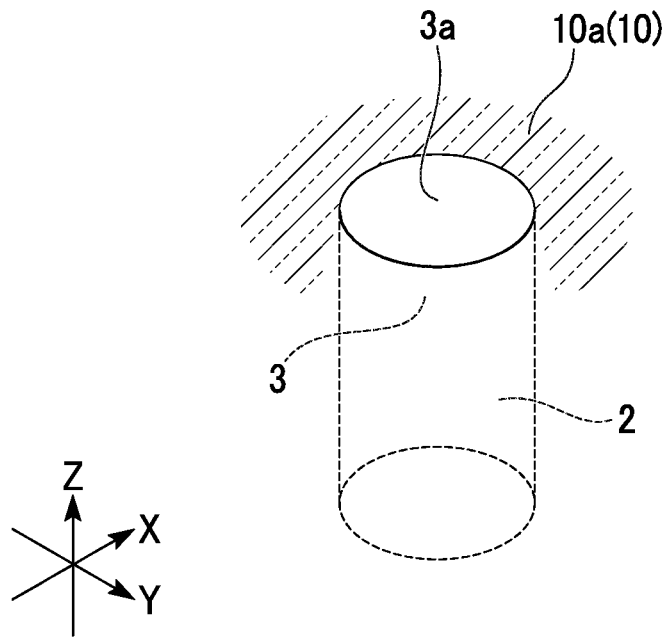
FIG. 4A is a perspective view showing a configuration of a through-hole, in a state in which a flow path and a diaphragm member are removed from FIG. 3.

FIG. 4A is a perspective view showing a configuration of the through-hole 2 while the flow path 21 and the diaphragm member 4 are removed from FIG. 3, and shows an aspect in which the through-hole 2 that constitutes the valve 1 has an opening section 3 formed in a first surface (an upper surface) 10a of a first substrate 10 that constitutes the laminated substrate 20. A first end portion of the through-hole 2 constitutes the opening section 3, and a second end portion of the through-hole 2 is opened at a not-shown place. Here, while the through-hole 2 that is exemplified has a circular cross-section in a radial direction, the cross-sectional shape is not particularly limited but may have an elliptical shape, a rectangular shape, a triangular shape, or another polygonal shape.

Figure 4B:
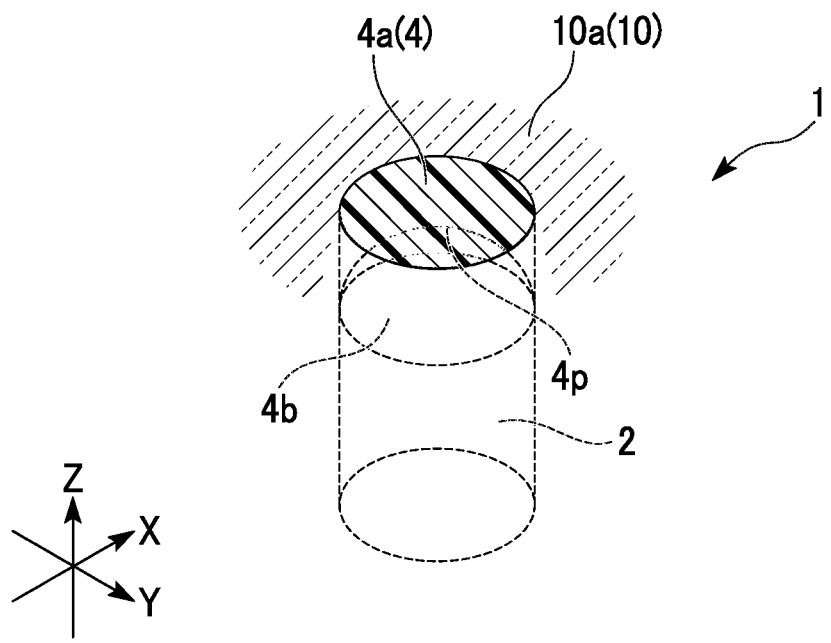
FIG. 4B is a perspective view showing the configuration of the valve including the diaphragm member.

FIG. 4B is a perspective view showing the valve 1 according to the first embodiment of the present invention.

The valve 1 of the embodiment includes the first substrate 10 in which the through-hole 2 opened at the first surface 10a is formed, and the diaphragm member 4 fitted and fixed into an inner wall surface 3a of the opening section 3 in the through-hole 2 and in which at least a central portion 4p has a thin film shape. The valve 1 can control a flow of a fluid in the flow path 21 by deforming at least the central portion 4p of the diaphragm member 4 (or a thin film-shaped portion).

Further, the diaphragm member 4 is fixed to a wall surface of the hole at at least two places and may not be fixed to the wall surface throughout the circumference. Accordingly, the diaphragm member 4 may be fixed to at least part of the inner wall surface 3a of the through-hole 2. In addition, the diaphragm member 4 is disposed at the opening section 3 side of the through-hole 2.

The diaphragm member includes a valve body, a deformable section and a movable section. In addition, "the flow of the fluid" includes, for example, a flow velocity or a flow rate. "Controlling the flow of the fluid" includes, for example, controlling a flow velocity or a flow rate of the fluid.

In the valve shown in FIG. 4B, a first surface 4a of the diaphragm member 4 facing the first surface side of the first substrate 10 is substantially parallel to and substantially flush with the first surface 10a of the first substrate 10. In addition, at least the central portion 4p of a second surface 4b opposite to the first surface 4a of the diaphragm member 4 has a concave shape (i.e., a substantially convex parabolic surface shape with respect to the first surface 4a opposite thereto). The parabolic surface is not limited to a geometrically symmetrical shape but a central portion of the second surface 4b may be concaved in a positive direction of the Z-axis (an axis of the through-hole 2). Meanwhile, an example of the geometrically symmetrical shape is a concave surface lens shape.

Further, a case in which the first surface 4a of the diaphragm member 4 is substantially flush with the first surface 10a of the first substrate 10 includes a case in which the first surface 4a of the diaphragm member 4 is disposed on an imaginary extension surface of the first surface 10a of the first substrate 10.

Figure 5:
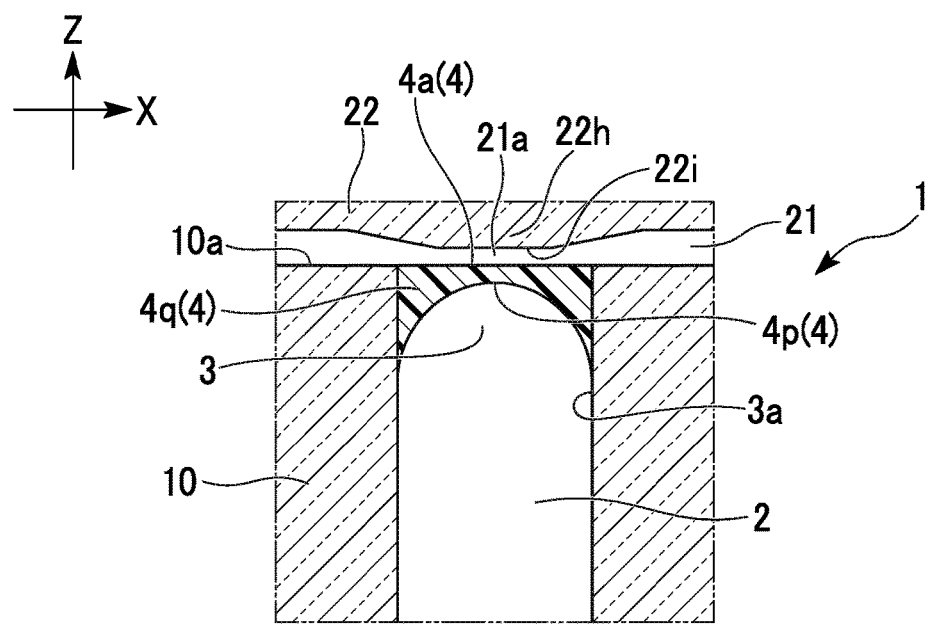
FIG. 5 is a cross-sectional view in which the laminated substrate is cut on an X-Z plane of FIG. 3.

FIG. 5 is a cross-sectional view in which the laminated substrate 20 is cut in an X-Z plane of FIG. 3. The flow path 21 is formed at an interface between the upper surface (the first surface) 10a of the first substrate 10 that constitutes the laminated substrate 20 and a lower surface of a second substrate 22. Specifically, the tunnel-shaped flow path 21 is formed by digging the groove in the lower surface of the second substrate 22 bonded to the first surface 10a of the first substrate 10, which is flat, and covering the groove using the first surface 10a of the first substrate 10. Accordingly, the first surface 10a of the first substrate 10 comes in contact with the fluid because the first surface 10a constitutes the lower surface of the flow path 21. In addition, the groove becomes shallow in the small diameter section 21a of the flow path 21.

A protrusion 22h (a protrusion section) configured to narrow the flow path 21 is formed at the flow path 21 constituted by the groove formed in the second substrate 22 at a position thereof opposite to the diaphragm member 4. The protrusion 22h shown in FIG. 5 is raised toward the central portion 4p of the diaphragm member 4 opposite thereto, and narrows a flow path width in a negative direction of the Z-axis. Accordingly, the protrusion section may be referred to as a bump section. The protrusion 22h has a surface 22i opposite to the diaphragm member 4. The surface 22i touches or adheres the first surface 4a (the upper surface) of the central portion 4p of the deformed diaphragm member 4 to close the flow path 21 (see FIG. 6). Accordingly, the surface 22i may be referred to as a contact surface 22i.

While the surface shape of the contact surface 22i is not particularly limited, for example, the surface shape of the contact surface 22i can be adjusted according to the shape of the first surface 4a of the diaphragm member 4 that comes in contact with the contact surface 22i to have a shape that can touch or adhere the first surface 4a. An example of the surface shape of the contact surface 22i may be a flat surface, a curved surface, a concave surface (a concave lens shape), a convex surface (a convex lens shape), or the like.

Figure 6:
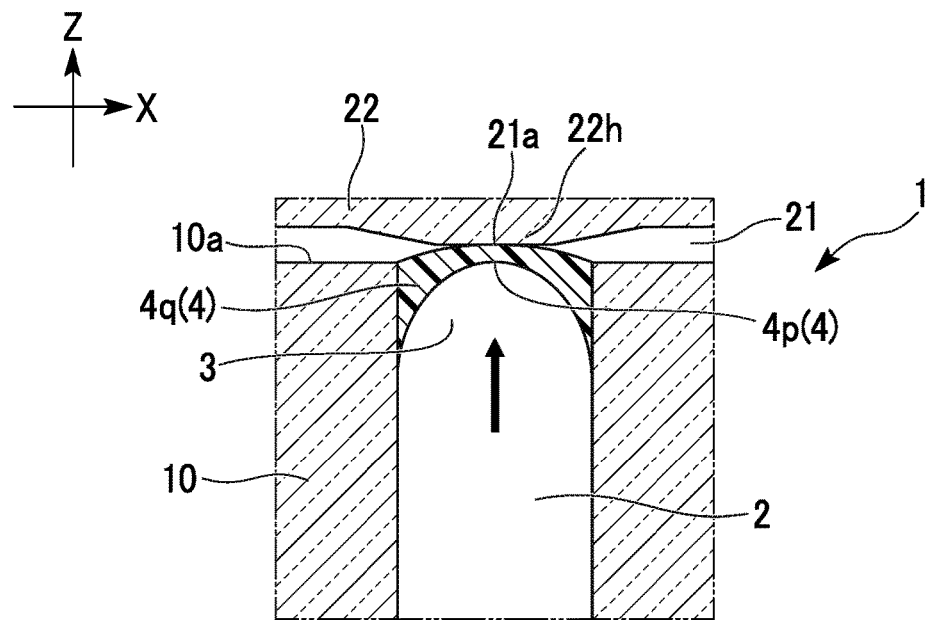
FIG. 6 is a cross-sectional view showing a state in which the valve according to the first embodiment closes the flow path.

As shown in FIG. 6, as an external force, for example, an air pressure (a pneumatic pressure) is applied to the diaphragm member 4 from the inside of the through-hole 2, and when the thin film-shaped central portion 4p of the diaphragm member 4 is inflated toward the flow path 21, the fluid flowing through the flow path 21 can be prevented from passing through the small diameter section 21a. That is, in the valve 1 of the embodiment, as the diaphragm member 4 is deformed in a direction perpendicular to an axial direction (an X-axis direction) of the flow path 21, the flow path 21 can be closed to control the flow of the fluid. The external force includes, for example, a water pressure, a magnetic force, a control by a mechanical mechanism, or the like.

In the valve 1 of the embodiment, while the diaphragm member 4 is fitted into the opening section 3 (the first end portion) of the through-hole 2, the through-hole 2 may be substituted with a non-through hole. In the case of the through-hole 2, for example, as a pump is connected to the second end portion of the through-hole and the fluid such as air or the like is injected into the through-hole or the fluid such as air or the like in the through-hole is discharged, the diaphragm member 4 can be deformed. Meanwhile, in the case of the non-through hole, as an example, a method of deforming the diaphragm member 4 using a method of heating and inflating the air in the non-through hole by a heater or the like disposed in the non-through hole can be employed.

As is understood from FIG. 5, a thickness of an outer edge section 4q of the diaphragm member 4 in contact with the inner wall surface 3a of the through-hole 2 is larger than that of the central portion 4p of the diaphragm member 4. Accordingly, since an adhered area between the outer edge section 4q and the inner wall surface 3a is increased, durability of the valve 1 can be improved. Further, strength of the outer edge section 4q in which stress concentration is most likely to occur when the diaphragm member 4 is deformed can be increased to prevent breakage of the diaphragm member 4. Meanwhile, as the thickness of the central portion 4p of the diaphragm member 4 is smaller than that of the outer edge section 4q, the central portion 4p can be deformed using a low air pressure.

Figure 7:
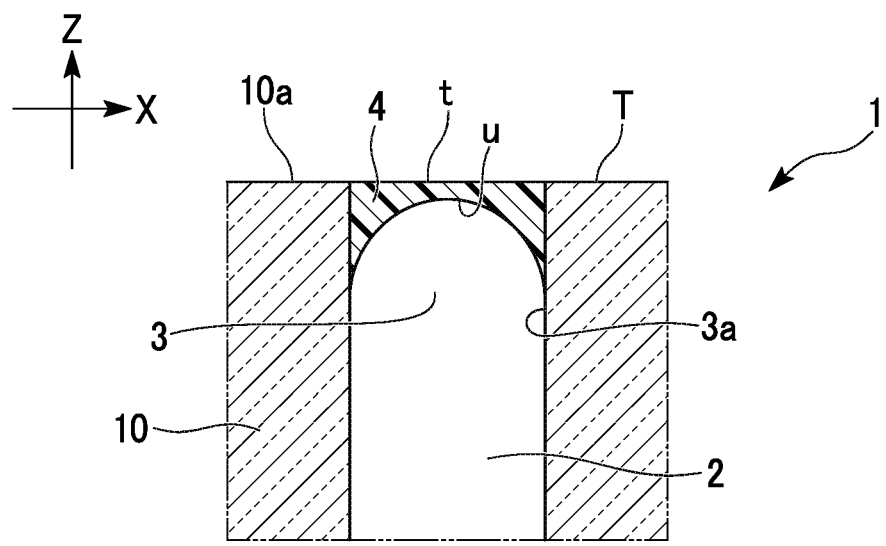
FIG. 7 is a cross-sectional view of the valve according to the first embodiment.

In a cross-section in a thickness direction of the first substrate 10 shown in FIG. 7, the thickness of the diaphragm member 4 is different at the central portion 4p and the outer edge section 4q that surrounds the central portion, and a first side t of the diaphragm member 4 facing the first surface 10a side of the first substrate 10 is a straight line substantially parallel to a first side T that constitutes the first surface 10a of the first substrate 10. In addition, as shown in FIG. 7, at least a central portion of a second side u opposite to the first side t of the diaphragm member 4 is a concave shape close to the first side t opposite thereto (i.e., a substantially parabolic shape that is convex with respect to the first side t opposite thereto).

The parabola is not limited to the geometrically symmetrical shape but the central portion of the second side u may be concaved in a positive direction of the Z-axis. The substantially parabolic shape may be referred to as an arch shape.

According to the above-mentioned parabolic shape, when the central portion 4p of the diaphragm member 4 is deformed upward, since the outer edge section 4q of the diaphragm member 4 is pressed toward the inner wall surface 3a along the arch shape, the diaphragm member 4 is prevented from being removed from the opening section 3 by the air pressure.

<Second Embodiment>

Figure 8:
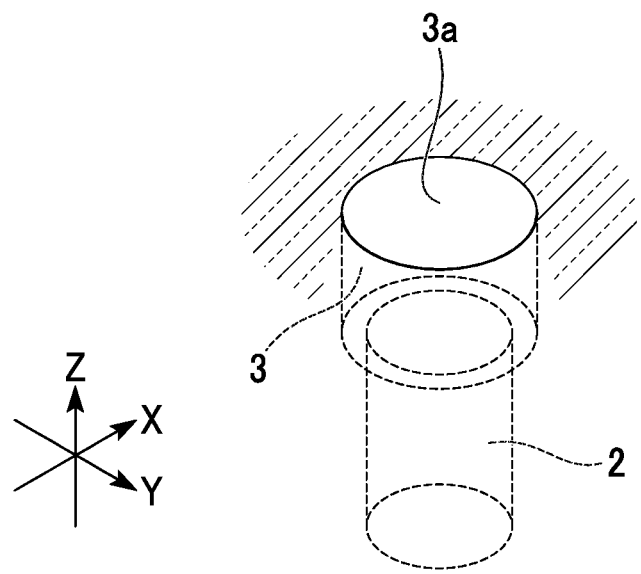
FIG. 8 is a perspective view showing a configuration of a through-hole that constitutes a valve according to a second embodiment of the present invention.

In a through-hole 2 that constitutes a valve of a second embodiment (see FIG. 8), an inner wall surface 3a that constitutes the opening section 3 is expanded outward in the radial direction of the through-hole 2, and an inner diameter (a hole diameter) of the opening section 3 is larger than an inner diameter of the through-hole 2 further inside than the opening section 3 (a lower portion of the drawing). An aspect in which the diaphragm member 4 is fitted into the inner wall surface 3a of the expanded opening section 3 is shown in a cross-sectional view of FIG. 9 together with the second substrate 22 that constitutes the flow path 21.

Figure 9:
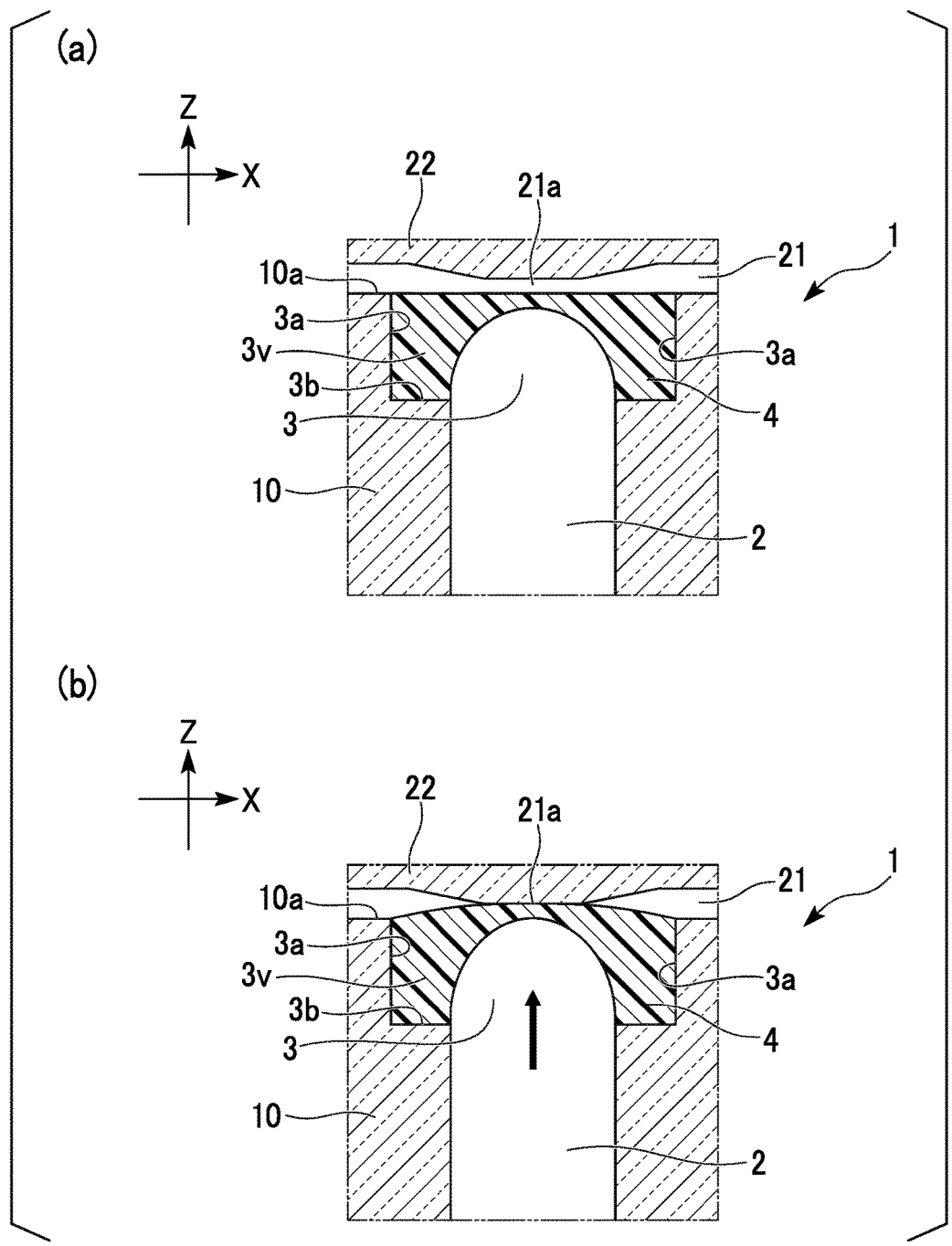
FIG. 9 is a cross-sectional view of the valve according to the second embodiment.

Part (a) of FIG. 9 shows a state in which the flow path 21 is opened immediately over the valve 1 of the second embodiment, and part (b) of FIG. 9 shows a state in which the valve 1 having a deformed diaphragm member 4 closes the flow path 21 by blowing the air into the through-hole 2.

When the opening section 3 of the through-hole 2 is expanded in this way, an adhered area between the diaphragm member 4 fitted into the inner wall surface 3a of the opening section 3 and the inner wall surface 3a is increased, and the diaphragm member 4 is more strongly fixed to the inner wall surface 3a. Accordingly, durability of repeated operations of the diaphragm member 4 can be further improved.

While the cross-sectional shape in the radial direction of the expanded opening section 3 of the second embodiment is substantially circular, the cross-sectional shape in the radial direction of the through-hole 2 inside further than the opening section 3 is also substantially circular and both of the cross-sectional shapes are similar to each other, these shapes need not be similar to each other. For example, the cross-sectional shape in the radial direction of the expanded opening section 3 may be a rectangular shape, and the cross-sectional shape in the radial direction of the through-hole 2 further inside than the opening section 3 may be a rectangular shape.

The hole that constitutes the valve 1 of the second embodiment is the through-hole 2, and the diaphragm member 4 is fixed to one end side (a first end portion side) in the through-hole 2. The hole constitutes a space through which the external force passes from the other end side (a second end portion side) of the through-hole 2 toward the diaphragm member 4.

In addition, the through-hole 2 has a step section 3v formed to extend with the inner wall surface 3a. The step section 3v is constituted by a portion in which the opening section 3 is expanded outward in the radial direction (an expansion section). The diaphragm member 4 is fixed to at least the wall surface 3a in a bottom surface 3b and the wall surface 3a of the step section 3v.

<Third Embodiment>

Figure 10:
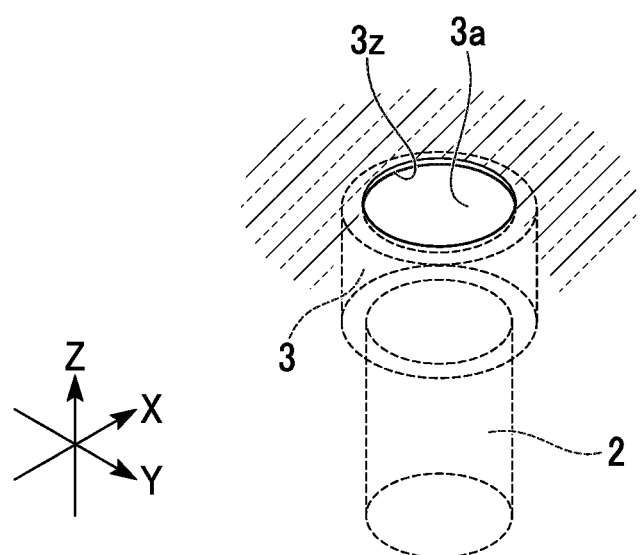
FIG. 10 is a perspective view showing a configuration of a through-hole that constitutes a valve according to a third embodiment of the present invention.

In a through-hole 2 that constitutes a valve of a third embodiment shown in FIG. 10, like the second embodiment, the inner wall surface 3a that constitutes the opening section 3 is expanded outward in the radial direction of the through-hole 2. Further, a throttling section 3z having a lateral cross-sectional area cut in the radial direction of the through-hole 2 smaller than another portion of the opening section 3 (a portion further inside than the end portion of the opening section 3) is formed in an inner wall surface 3a that constitutes an end portion (an edge) of the opening section 3. An aspect in which the diaphragm member 4 is fitted into the inner wall surface 3a of the opening section 3 at which the throttling section 3z is formed is shown in a cross-sectional view of FIG. 11 together with the second substrate 22 that constitutes the flow path 21.

Figure 11:
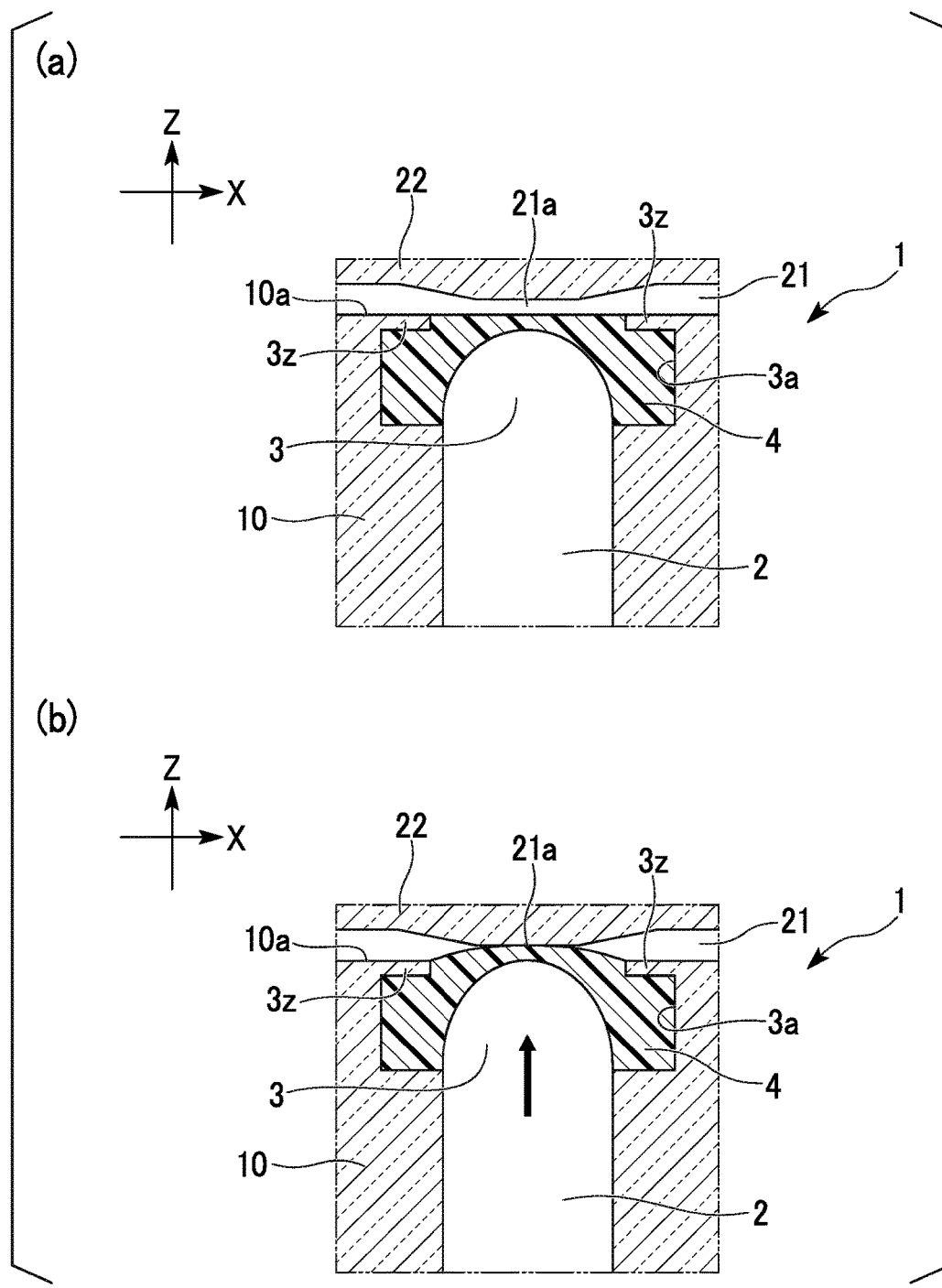
FIG. 11 is a cross-sectional view of the valve according to the third embodiment.

Part (a) of FIG. 11 shows a state in which the flow path 21 is opened immediately over the valve 1 of the third embodiment, and part (b) of FIG. 11 shows a state in which the valve 1 having the diaphragm member 4 that is deformed closes the flow path 21 by blowing air into the through-hole 2.

When the throttling section 3z is formed in this way, the adhered area between the diaphragm member 4 fitted into the inner wall surface 3a of the opening section 3 and the inner wall surface 3a is further expanded, the diaphragm member 4 in operation is prevented from being removed toward the flow path 21, and the diaphragm member 4 is more strongly fixed to the inner wall surface 3a. Accordingly, durability of repeated operations of the diaphragm member 4 can be further improved.

<Fourth Embodiment>

In a through-hole 2 that constitutes a valve of a fourth embodiment shown in FIG. 12, an expansion section 3y in which an end portion (an edge) of the inner wall surface 3a that constitutes the opening section 3 is expanded outward in the radial direction of the through-hole 2 is formed. A cross-sectional shape in the radial direction of the expansion section 3y is a rectangular shape.

Figure 13:
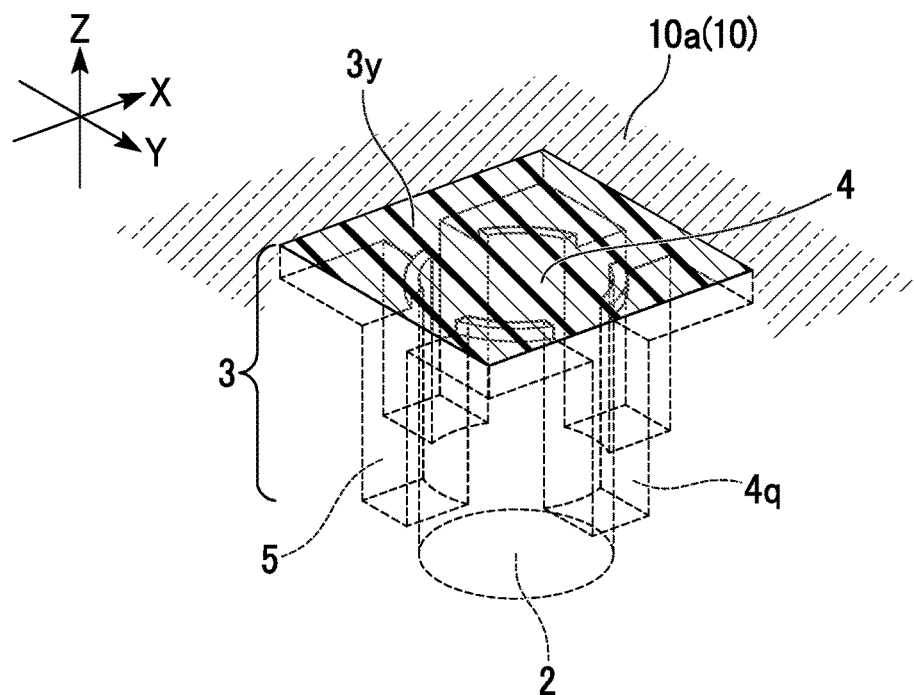
FIG. 13 is a perspective view showing an aspect in which a diaphragm member is disposed at an opening section of the through-hole shown in FIG. 12.

Further, in the inner wall surface 3a that constitutes the opening section 3 further inside than the expansion section 3y, four concave sections 5 expanded outward in the radial direction of the through-hole 2 are formed to be point-symmetrically disposed around the axis of the through-hole 2. An aspect in which the outer edge section 4q of the diaphragm member 4 is formed to extend in the concave section 5 is shown in FIG. 13. In addition, a cross-sectional view along the X- and Z-axes including the axis of the through-hole 2 of FIG. 13 is shown in FIG. 14, in which the second substrate 22 that constitutes the flow path 21 is also included.

Part (a) of FIG. 14 shows a state in which the flow path 21 is opened immediately over the valve 1 of the fourth embodiment, and part (b) of FIG. 14 shows a state in which the valve 1 having the diaphragm member 4 that is deformed closes the flow path 21 by blowing air into the through-hole 2.

When the expansion section 3y is formed at a portion (in the example, an end portion) of the opening section 3 in this way, the adhered area between the diaphragm member 4 fitted into the inner wall surface 3a of the opening section 3 and the inner wall surface 3a is increased, and the diaphragm member 4 is more strongly fixed to the inner wall surface 3a. Further, in the embodiment, the outer edge section 4q of the diaphragm member 4 is formed to extend in the concave section 5, and the inner wall surface 3a that constitutes the concave section 5 and the outer edge section 4q of the diaphragm member 4 are at least partially bonded to each other. Accordingly, the adhered area between the diaphragm member 4 and the inner wall surface 3a is further increased, and the diaphragm member 4 is more strongly fixed to the inner wall surface 3a. As a result, the diaphragm member 4 upon operation of the valve is prevented from being removed toward the flow path 21, and durability of repeated operation of the diaphragm member 4 can be further improved.

In the valve of the fourth embodiment, a plan view (an X-Y plane) showing the perspective view of FIG. 12 from above is shown in FIG. 15, and a cross-sectional view (an X-Z plane) showing the perspective view of FIG. 12 from a side is shown in FIG. 16.

As shown in FIGS. 15 and 16, a plurality of concave sections 5 expanded outward in the radial direction are formed in the opening section 3 of the through-hole 2, and the concave sections 5 neighboring each other are separated by a partition wall 6. Further, the partition wall 6 is part of the first substrate 10, and a separate member is not attached thereto.

An end surface 6a of an upper portion of the partition wall 6, i.e., a surface 6a of an end portion of the partition wall 6 facing the first surface 10a side of the first substrate 10 is disposed further inside than the first surface 10a of the first substrate 10 (a -Z side), i.e., inside the through-hole 2. In addition, the neighboring concave sections 5 are spatially connected to each other in the vicinity of the end surface 6a of the partition wall 6 in a state in which the diaphragm member 4 is not disposed (a state of FIGS. 12, 15 and 16).

A space in which the neighboring concave sections 5 are connected constitutes part of the expansion section 3y of the above-mentioned opening section 3, and as shown in FIG. 13, the diaphragm member 4 is disposed in the concave section 5 and in the space in which the concave section 5 are connected. Therefore, in the through-hole 2 that constitutes the valve 1, only the space that configures a portion immediately under the center portion 4p of the diaphragm member 4 is a cavity and comes in communication with the second end portion of the through-hole. Accordingly, the air pressure transmitted from the second end portion when the valve 1 is operated is applied to the center portion 4p of the diaphragm member 4. Since the center portion 4p has a thin film shape, the central portion 4p is easily expanded to be deformed toward the flow path 21.

Basically, while the end surface 6a of the upper portion of the partition wall 6 is a flat surface that is substantially parallel with the first surface 10a of the first substrate 10, a protrusion 6h protruding toward the first surface 10a of the first substrate 10 is formed at the edge portion facing the central axis of the through-hole 2. The protrusion 6h has a curved plate shape, and a plate surface of the protrusion 6h is disposed to confront the central axis of the through-hole 2. Here, while not shown, a groove may be formed in the end surface 6a of the upper portion of the partition wall 6, in addition to the protrusion 6h. As the above-mentioned protrusion or groove is formed at the end surface 6a, an adhesive force between these components and the diaphragm member 4 can be enhanced, and the diaphragm member 4 can be more strongly fixed to the opening section 3.

FIG. 17 shows a perspective view showing the laminated substrate 20 including the valve 1 and the flow path 21 of the fourth embodiment.

<Fifth Embodiment>

FIG. 18 shows a perspective view of the laminated substrate 20 including a valve 1 and a flow path 21 of a fifth embodiment. In addition, a structure in which the through-hole 2 is formed in the first substrate 10 that constitutes the valve 1 of the fifth embodiment is shown in FIG. 19. Further, a plan view showing the perspective view of FIG. 19 from above (the X-Y plane) is shown in FIG. 20, and a cross-sectional view showing the perspective view of FIG. 19 from a side (the X-Z plane, a cross-sectional view taken along line A-A of FIG. 20) is shown in FIG. 21.

As shown in FIGS. 20 and 21, a plurality of concave sections 5 expanded outward in the radial direction are formed in the opening section 3 of the through-hole 2, and the neighboring concave sections 5 are separated by the partition wall 6.

The concave sections 5 are formed to be disposed point-symmetrically around the axis of the through-hole 2. In addition, the neighboring concave sections 5 are spatially connected to each other in the vicinity of the end surface 6a of the partition wall 6 in a state in which the diaphragm member 4 is not disposed (a state of FIGS. 19, 20 and 21). While not shown, like the fourth embodiment, even in the valve 1 of the embodiment, the outer edge section 4q of the diaphragm member 4 is formed to extend in the concave section 5.

The end surface 6a of the upper portion of the partition wall 6, i.e., the surface 6a of the end portion of the partition wall 6 facing the first surface 10a side of the first substrate 10 is disposed further inside than the first surface 10a of the first substrate 10 (the -Z side), i.e., inside the through-hole 2. A protrusion 6h, a groove 6k and a protrusion 6i are formed at the end surface 6a of the upper portion of the partition wall 6 in sequence from the central axis of the through-hole 2 outward in the radial direction. The protrusion 6h has a curved plate shape. A plate surface of the protrusion 6h is disposed to confront the central axis of the through-hole 2. The protrusion 6i is a curved plate shape. The plate surface of the protrusion 6i is disposed to confront the central axis of the through-hole 2. The groove 6k is disposed between the protrusion 6h and the protrusion 6i to cross the partition wall 6 to connect the neighboring concave sections 5. As the above-mentioned protrusion or groove is formed at the end surface 6a, an adhesive force between these components and the diaphragm member 4 can be enhanced, and the diaphragm member 4 can be more strongly fixed to the opening section 3.

<Sixth Embodiment>

In a through-hole 2 that constitutes a valve of a sixth embodiment shown in FIG. 22, an expansion section 3y in which an end portion of the inner wall surface 3a that constitutes the opening section 3 is expanded outward in the radial direction of the through-hole 2 is formed. A cross-sectional shape in the radial direction of the expansion section 3y is a rectangular shape.

Further, except for a peripheral edge portion 2z of the through-hole 2 in a boundary between the expansion section 3y and the through-hole 2, a depression section 3q in which the bottom surface 3b of the expansion section 3y is recessed at a side lower than the peripheral edge portion 2z (a negative direction of the Z-axis shown in the drawing), i.e., inside the first substrate 10 is formed. A plan view (the X-Y plane) in which the depression section 3q formed at the expansion section 3y is seen from above is shown in FIG. 23.

Like the above-mentioned other embodiments, the diaphragm member 4 is fitted and fixed into the inner wall surface 3a of the opening section 3 of the through-hole 2 in the valve 1 of the embodiment. Further, the outer edge section 4q of the diaphragm member 4 is formed to extend at the depression section 3q. The aspect is shown in FIGS. 24 and 25.

In FIGS. 22 to 25, a branch hole 2u in the through-hole 2 connected to the through-hole 2 is a through-hole through which a fluid such as air or the like in the through-hole 2 enters or exits. One end portion (a first end portion) of the branch hole 2u is connected to the through-hole 2, and the other end portion (a second end portion) is opened at a not-shown place. The other end portion may function as a second end portion of the through-hole 2, or may be an end portion independent from the second end portion of the through-hole 2. For example, as the air is blown into the through-hole 2 from the other end portion of the branch hole 2u, the central portion 4p of the diaphragm member 4 is deformed, and a flow of the fluid in the flow path (not shown) can be controlled.

When the expansion section 3y and the depression section 3q are formed as part of the opening section 3 in this way, an adhered area between the diaphragm member 4 fitted into the inner wall surface 3a of the opening section 3 and the inner wall surface 3a of the opening section 3 including the expansion section 3y and the depression section 3q is increased, and the diaphragm member 4 is more strongly fixed to the inner wall surface 3a of the opening section 3. As a result, the diaphragm member 4 upon an operation of the valve can be prevented from being removed, and durability of repeated operations of the diaphragm member 4 can be further improved.

<Seventh Embodiment>

In a through-hole 2 that constitutes a valve of a seventh embodiment shown in FIG. 26, an expansion section 3y in which an end portion of the inner wall surface 3a that constitutes the opening section 3 (a portion facing the first surface 10a of the first substrate 10) is expanded outward in the radial direction of the through-hole 2 is formed. A cross-sectional shape in the radial direction of the expansion section 3y is circular.

Further, part of a bottom surface of the expansion section 3y (corresponding to the bottom surface 3b of the sixth embodiment) except for the peripheral edge portion 2z of the through-hole 2 in the boundary between the expansion section 3y and the through-hole 2 (the through-hole 2 of the inner side except for the expansion section 3y) forms a bottom surface 7b of a longitudinal hole section 7 inserted and formed in a side lower than the peripheral edge portion 2z (a negative direction of the Z-axis shown), i.e., inside the first substrate 10. That is, at least part of the expansion section 3y except for the peripheral edge portion 2z of the through-hole 2 is formed to extend inside the first substrate 10 along the through-hole 2 to constitute the longitudinal hole section 7.

Here, for the convenience of description, while a configuration in which the bottom surface 7b of the longitudinal hole section 7 is formed, i.e., a configuration in which the longitudinal hole section 7 is a non-through hole has been described, the longitudinal hole section 7 may not have the bottom surface 7b. In this case, in a state in which the diaphragm member 4 is not disposed, the longitudinal hole section 7 is a through-hole. Here, the through-hole constituted by the longitudinal hole section 7 is different from the through-hole 2 opened at the first substrate 10. When the longitudinal hole section 7 is a through-hole, one end portion (a first end portion) of the through-hole is opened in the vicinity of the expansion section 3y, and the other end portion (a second end portion) is opened at a not-shown place. The longitudinal hole section 7 may be freely exposed to the atmosphere at the other end portion. The other end portion may be opened at, for example, the second surface of the first substrate to be freely exposed to the atmosphere.

In the embodiment, four longitudinal hole sections 7 are formed to be disposed point-symmetrically about the axis of the through-hole 2. In addition, the neighboring longitudinal hole sections 7 are separated by a partition wall section 8. An end surface 8a of the upper portion of the partition wall section 8 (a surface in the positive direction side of the Z-axis, a surface facing the first surface 10a of the first substrate 10) is disposed further inside the first substrate 10 than the first surface 10a. A plan view (the X-Y plane) showing the four longitudinal hole sections 7 from above is shown in FIG. 27.

As shown in FIGS. 26 and 27, in a state in which the diaphragm member 4 is not disposed, the neighboring longitudinal hole sections 7 are spatially connected in the vicinity of the end surface 8a of the partition wall section 8. In addition, the longitudinal hole sections 7 come in communication with the through-hole 2 via the peripheral edge portion 2z of the through-hole 2 at the boundary between the expansion section 3y and the through-hole 2.

Like the above-mentioned other embodiments, the diaphragm member 4 is fitted and fixed into the inner wall surface 3a of the opening section 3 of the through-hole 2 in the valve 1 of the embodiment. Further, the outer edge section 4q of the diaphragm member 4 is formed to extend at the longitudinal hole section 7 that is formed to extend from the expansion section 3y in a thickness direction of the first substrate 10. The aspect is shown in FIGS. 28 to 30. FIG. 29 corresponds to a cross-section taken along line A-A of FIG. 27, and FIG. 30 corresponds to a cross-section taken along line B-B of

FIG. 27.

As shown in FIGS. 28 to 30, the longitudinal hole section 7 and the through-hole 2 are separated by a support wall 9 that constitutes a lower side of the peripheral edge portion 2z (a negative direction side of the Z-axis) and supports the diaphragm member 4. That is, one surface (a first surface) 9a of the support wall 9 constitutes an inner wall surface of the through-hole 2, and the other surface (a second surface) 9b of the support wall 9 constitutes a wall surface of the longitudinal hole section 7.

As the diaphragm member 4 is disposed in the space as configured above, in addition to adhesion between the inner wall surface 3a that constitutes the expansion section 3y of the opening section 3 and the outer edge section 4q of the diaphragm member 4, further, a wall surface that constitutes the longitudinal hole section 7 formed to extend from the expansion section 3y and the outer edge section 4q of the diaphragm member 4 are bonded to each other. For this reason, as a result of further expansion of the adhered area between the outer edge section 4q of the diaphragm member 4 and the inner wall surface of the opening section 3 including the longitudinal hole section 7 and the expansion section 3y, the diaphragm member 4 upon an operation of the valve is prevented from being removed, and durability of repeated operations of the diaphragm member 4 can be further improved.

Further, in FIGS. 26 to 29, the branch hole 2u connected to the through-hole 2 in an inner part of the through-hole 2 is a through-hole through which a fluid such as air or the like in the through-hole 2 enters or exits. One end portion (a first end portion) of the branch hole 2u is connected to the through-hole 2, and the other end portion (a second end portion) is opened at a not-shown place. The other end portion may function as the second end portion of the through-hole 2, or an end portion independent from the second end portion of the through-hole 2. For example, as the air is blown into the through-hole 2 from the other end portion, the central portion 4p of the diaphragm member 4 can be deformed to control the flow of the fluid in the flow path (not shown).

<Operating Manner of Valve>

As an operating manner of the valve of each of the embodiments according to the present invention as described above, the case in which the diaphragm member that constitutes the valve is expanded to the outside of the hole to close the flow path (a normally open type) has been exemplarily described. However, the operating manner is not limited to the case, but the operating manner in which as the diaphragm member that constitutes the valve is recessed (sunken) toward the inside of the hole, the flow path that is closed till that time is opened (a normally closed type) can also be employed. In the latter operating manner, the valve of the first embodiment will be exemplarily described as follows.

As shown in FIG. 31, a protrusion 22h of a dividing section 21b is formed at the flow path 21 constituted by a groove formed in the second substrate 22. Since the protrusion 22h is bonded to the diaphragm member 4 opposite thereto, the flow path 21 is closed in the dividing section 21b. In this state, when the fluid such as the air or the like in the through-hole 2 is suctioned from the second end portion of the through-hole 2, as shown in FIG. 32, as the central portion 4p of the diaphragm member 4 is drawn into the through-hole 2, a dividing section 21 is opened. When the suctioning is stopped, the central portion 4p of the diaphragm member 4 is returned to its original position to close the dividing section 21. The operating manner is not limited to the valve of the above-mentioned first embodiment but can be similarly applied also to the valves of the other embodiments.

<Expansion of Diaphragm Member>

In the valve 1 of each of the embodiments according to the present invention, the outer edge section 4q of the diaphragm member 4 fixed to the inner wall surface 3a of the opening section 3 may be expanded to push out onto the first surface 10a of the first substrate 10. An example of the embodiment will be described as a variant of the first embodiment as follows.

As shown in FIG. 33, in the valve of the example, the outer edge section 4q of the diaphragm member 4 is fitted into the inner wall surface 3a of the opening section 3 of the through-hole 2 to be adhered to the inner wall surface 3a. Further, the diaphragm member 4 has expansion sections 4r that are expanded such that the outer edge section 4q is pushed out onto the first surface 10a of the first substrate 10. While a range in which the expansion sections 4r are formed to extend is not particularly limited, for example, the range is in a neighborhood degree of the opening section 3 and appropriately 2 to 10 times a hole diameter of the opening section 3 from the center of the opening section 3. When the expansion sections 4r in which the diaphragm member 4 is expanded are provided in this way, the adhered area between the diaphragm member 4 and the first substrate 10 is increased, and the diaphragm member 4 can be more strongly fixed. In addition, a plurality of grooves 11 are formed in the first surface 10a of the first substrate 10, and the expansion sections 4r are disposed in the grooves 11, respectively. When the configuration is provided, the expansion sections 4r disposed in the grooves 11 can further increase the adhered area. Further, when the through-hole 2 has a positive pressure or a negative pressure to actuate the valve, since the pressure is applied to only the central portion 4p of the diaphragm member 4, and particularly, the pressure is not mostly applied to the outer edge section 4q of the diaphragm member 4 formed to extend in the longitudinal hole section 7, durability of the valve is particularly good.

<Member Bonded to Inner Wall Surface of Through-Hole>

In the valve 1 of each of the embodiments according to the present invention, a member different from the first substrate 10 may be attached to at least part of the inner wall surface of the through-hole 2. An example of the embodiment will be described as a variant of the first embodiment as follows.

As shown in a cross-sectional view of FIG. 34 and plan views of FIGS. 36A and 36B, in the valve of the example, a first member 12 is bonded to the entire circumference of the end portion of the inner wall surface 3a that constitutes the opening section 3 of the through-hole 2 (a portion facing the first surface 10a of the first substrate 10).

When seen from the first surface 10a side of the first substrate 10, the first member 12 has an opening section. A shape of the opening section is not particularly limited thereto but may be a circular shape (FIG. 36A) or a rectangular shape (see FIG. 36B) as an example. The first surface 4a of the diaphragm member 4 is exposed to the opening section of the first member 12. The first member 12 having the opening section may be referred to as a seal member (for example, a seal ring).

A constituent material of the first member 12 is, for example, a resin, an elastomer, a metal, ceramics, a glass, or the like. A method of bonding the first member 12 to the inner wall surface 3a is, for example, an adhesive agent, a method such as hot welding or the like.

In the valve of the example, the diaphragm member 4 is fixed to at least part of the first member 12. As an example, as shown in a cross-sectional view of FIG. 34, a portion of the outer edge section 4q of the diaphragm member 4 may be adhered to a side surface 12a of the first member 12 and the remaining part except for the portion may be fixed to the inner wall surface 3a of the through-hole 2, or as shown in a cross-sectional view of FIG. 35, the entirety of the outer edge section 4q of the diaphragm member 4 (the entire surface of the portion opposite to the inner wall surface 3a) may be fixed to the side surface 12a of the first member 12. That is, the diaphragm member 4 may be directly fixed to the wall surface (in this case, the inner wall surface 3a), or may be indirectly fixed to the wall surface (in this case, the inner wall surface 3a) via the first member 12.

Even in the above-mentioned direct and/or indirect fixing, the diaphragm member 4 is formed in the through-hole 2, and fixed to at least a portion (a region close to the inner wall surface 3a spaced apart from the central axis of the through-hole) of an outer edge of the opening section 3 of the through-hole 2. In addition, since at least the central portion 4p of the diaphragm member 4 has a thin film shape, as the diaphragm member 4 is deformed in the above-mentioned operating method, the flow of the fluid in the flow path can be controlled.

As the first member 12 is formed, the diaphragm member 4 can be more strongly fixed in the opening section 3. In addition, upon manufacturing the valve, the diaphragm member 4 can be easily fixed to the opening section 3 of the through-hole 2.

<<Fluid Control Structure>>

A fluid control structure of a second aspect of the present invention includes a substrate having a first surface in contact with a fluid and in which a through-hole is formed, an elastically deformable valve body fitted into the opening section of the first surface of the through-hole and in which at least a central portion has a thin film shape, and a driving unit configured to deform the valve body in a direction perpendicular to the axis of the flow path.

The fluid control structure is included in each of the embodiments of the above-mentioned valve. The substrate may be, for example, the first substrate 10 having the first surface 10a in contact with a fluid and in which the through-hole 2 is formed. In addition, the elastically deformable valve body may be, for example, the diaphragm member 4 fitted into the opening section 3 of the first surface 10a and in which at least the central portion 4p has a thin film shape. In addition, the driving unit may be, for example, a pump configured to inject or discharge the fluid such as the air or the like serving as power to deform the diaphragm member 4 in an axial direction of the through-hole 2 into/from the through-hole 2.

The fluid control structure may include a driving unit configured to deform the valve body toward the flow path, and be a structure that is deformed from an open state in which the fluid in the flow path flows to a closed state in which the flow of the fluid is blocked.

In the fluid control structure, a fluid control method of varying a flowing state of the flow path from the open state in which the fluid can flow through the flow path to the closed state in which the fluid cannot flow through the flow path by deforming the valve body using the driving unit and blocking the fluid using the valve body deformed in the flow path can be performed.

The fluid control structure may include a driving unit configured to deform the valve body toward the flow path, and be a structure that is deformed from a closed state in which the flow of the fluid is blocked to an open state in which the fluid flows through the flow path.

In the fluid control structure, a fluid control method of varying a flowing state of the flow path from the closed state in which the fluid cannot flow through the flow path to the open state in which the fluid can flow through the flow path by deforming the valve body that blocks the fluid in the flow path using the driving unit can be performed.

<<Fluid Device>>

A fluid device of a third aspect of the present invention is a fluid device including the valve of the first aspect or the fluid control structure of the second aspect. Further, the flow path and the valve that constitute the fluid device of the third aspect may be a micrometer scale or may be a millimeter scale. Even in the fluid device of any scale, the fluid device can be referred to as "a micro fluid device" in view of a device having a fine flow path.

The fluid device may be, for example, a fluid device including a first substrate having the valve of the first aspect or the fluid control structure of the second aspect, a second substrate to which the diaphragm member that constitutes the valve of the first substrate or the valve body that constitutes the fluid control structure is exposed and overlapping the first surface of the first substrate, and a flow path formed to cross immediately over the diaphragm member or the valve body of the second substrate.

The fluid device may be, for example, a laminated substrate including each of the embodiments of the above-mentioned valve, and as an example, the laminated substrate 20 in which the flow path 21 shown in FIGS. 3, 17 and 18 is formed.

In addition, the fluid device may be a model in which a base member having the valve is adhered to an upper plate to form a housing flow path.

<Pump Function>

The fluid device can function as a pump configured to produce a flow of the fluid in the flow path by opening and closing a plurality of valves disposed in the flow path in series or by opening and closing a single valve disposed in the flow path.

As an example, as the plurality of valves are synchronized to control opening and closing the valves, waves are generated from the fluid in the flow path, and the fluid can flow in a predetermined direction. For example, in preferably two or more valves and in more preferably three or more valves disposed in the flow path in series, the fluid in the flow path can be delivered in a predetermined direction using a so-called peristaltic method of offsetting timings of deformation of the valve bodies (diaphragm members) at predetermined intervals and controlling the opening and closing of the valves. Kinds and operating manners of the valves disposed in the flow path may be equal to each other or may be different from each other.

In addition, as another example, as the opening and closing of the single valve is repeated in a unit time, waves are generated from the fluid in the flow path, and the fluid can flow in a predetermined direction.

<Detection of Biomolecule>

The fluid device may be a fluid device configured to detect a biomolecule contained in an exosome in a sample. The above-mentioned fluid device may be, for example, a fluid device including the valve of the first aspect or the fluid control structure of the second aspect, an exosome-refining section having a layer modified with a compound having a hydrophobic chain or a hydrophilic chain, and a biomolecule detection section.

An example of the fluid device may be a fluid device 51 shown in FIG. 37. The fluid device 51 is a fluid device configured to detect a biomolecule contained in an exosome in a sample, and includes an exosome-refining section 52 having a layer modified with a compound having a hydrophobic chain and a hydrophilic chain, a biomolecule-refining section 53, a biomolecule detection section 54, a first flow path 55 that connects the exosome-refining section 52 and the biomolecule-refining section 53, a second flow path 56 that connects the biomolecule-refining section 53 and the biomolecule detection section 54, and the valves of the first aspect disposed at desired places of the flow paths.

The fluid device 51 of the embodiment is a device configured to obtain a sample containing blood plasma in which a blood corpuscle is removed from blood and detect a biomolecule contained in the exosome in the sample supplied into the exosome-refining section 52.

In the embodiment, the first flow path 55 is a flow path configured to deliver a disrupted liquid of the exosome from the exosome-refining section 52 to the biomolecule-refining section 53, and the second flow path 56 is a flow path configured to deliver a solution including a refined biomolecule to the biomolecule detection section 54.

The exosome is a secreted material of a cell, and contains a biomolecule from a cell of a secretion source, for example, a protein, a nucleic acid, a miRNA, or the like. An abnormal cell such as a cancer cell or the like present in a living body expresses a unique protein, nucleic acid, miRNA, or the like, in the cell membrane.

For this reason, abnormality of the cell of the secretion source can be detected by analyzing the biomolecule contained in the exosome. A means for drawing out (extracting) the biomolecule contained in the exosome may be, for example, fragmentation or the like of a lipid bilayer of the exosome.

Further, since the exosome is detected in a body fluid such as blood that circulates in the living body, urine, saliva, or the like, abnormality in the living body can be detected by analyzing the exosome without biopsy inspection.

In view of prevention of secondary infection by a sample used for analysis, the fluid device 51 of the embodiment may further include, for example, waste liquid tanks 57, 58 and 59 as shown in FIG. 38. Further, in FIG. 38, while three waste liquid tanks are shown, the three waste liquid tanks may be integrated as one or two waste liquid tanks.

An example of each configuration of the fluid device 51 of the embodiment will be described with reference to FIG. 39. The exosome-refining section 52 is a portion in which fixation of the exosome and fragmentation of the exosome contained in the supplied sample is performed, and includes an inlet and an exosome-fixing section 52*d* having a layer modified with a compound having a hydrophobic chain and a hydrophilic chain. As shown in FIG. 39, the exosome-refining section 52 can include inlets according to introduced reagents. That is, the exosome-refining section 52 can include a sample introduction inlet 52*b* and a disrupted liquid introduction inlet 52*c*. Preferably, the exosome-refining section 52 can further include a cleaning liquid introduction inlet 52*a*.

In the fluid device 51 of the embodiment, driving of the liquid in the respective parts is performed by an external suction pump, and a flow of the liquid is controlled by opening and closing of the valve of the first aspect of the present invention.

As shown in FIG. 39, in analysis of the exosome, first, in the above-mentioned exosome-refining section 52, the sample containing the blood plasma is injected into the sample introduction inlet 52*b*, a valve 52*f* of a flow path 52*i* is opened, and the sample is introduced into the exosome-fixing section 52*d* by suction.

The exosome in the sample introduced into the exosome-fixing section 52*d* is captured by the compound having the hydrophobic chain and the hydrophilic chain.

Here, the compound having the hydrophobic chain and the hydrophilic chain in the exosome-fixing section 52*d* is a compound having a hydrophobic chain to be coupled to a lipid bilayer and a hydrophilic chain to dissolve the lipid chain. As such a compound is used, the exosome having the lipid bilayer can be fixed onto the exosome-fixing section 52*d*.

Further, "fixing the exosome onto the exosome-fixing section 52*d*" also means that the exosome is adsorbed to the exosome-fixing section. The exosome can be isolated from the sample.

The hydrophobic chain may be a single chain or a double chain, and for example, may be a saturated or unsaturated hydrocarbon group that may have a substituent.

The saturated or unsaturated hydrocarbon group can be an alkyl group or an alkenyl group of a straight chain or a branch chain having 6 to 24 carbon atoms. Examples include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, a stearyl group (an octadecyl group), a nonadecyl group, an icosyl group, a henicosyl group, a docosyl group, a tricosyl group, a tetracosyl group, a millistrail group, a palmitoleyl group, an oleyl group, a linoyl group, a linolcyl group, a ricinoleyl group, an instearyl group.

Particularly, aniflistrail group, a palmitoleyl group, an oleyl group, a linoyl group and a linoleyl group are preferable, and the oleyl group is more preferable.

The hydrophilic chain may be protein, oligopeptide, polypeptide, polyacrylamide, polyethylene glycol (PEG), dextran, and so on, and the PEG is preferable. The hydrophilic chain is preferably chemically modified by coupling to the substrate, preferably has an active ester group, and in particular, preferably has an N-hydroxysuccinimide group.

A substrate used as the exosome-fixing section 52*d* may be a glass substrate, a silicon substrate, a polymer substrate, a metal substrate, or the like. The substrate may have a structure in which, via a material coupled to a hydrophilic chain of a compound having a hydrophobic chain and the hydrophilic chain, the compound is coupled to a surface of the substrate. The material can be a material having an amino group, a carboxyl group, a thiol group, a hydroxyl group and an aldehyde group, and 3-aminopropyltriethoxysilane is preferable.

In the blood plasma, in addition to the exosome, extracellular vesicles such as micro vesicles, apoptosis bodies, or the like, are contained, and the extracellular vesicles may be fixed to the exosome-fixing section 52*d*. In view of removal of the extracellular vesicles from the exosome-fixing section 52*d*, the exosome on the exosome-fixing section 52*d* can be cleaned.

Next, the exosome fixed to the exosome-fixing section 52*d* is fragmented. As shown in FIG. 39, a valve 52*g* on a flow path 52*j* is opened, the disrupted liquid is injected into the disrupted liquid introduction inlet 52*c*, and the disrupted liquid is introduced into the exosome-fixing section 52*d* by suction. The disrupted liquid may be a liquid known in the related art that is used in, for example, cell dissolution.

As the disrupted liquid passes through the exosome-fixing section 52*d*, the exosome captured onto the exosome-fixing section 52*d* is fragmented, and the biomolecule contained in the exosome is discharged.

The biomolecule discharged from the exosome is delivered to the biomolecule-refining section 53 through the first flow path 55 via a valve 55*a*.

As shown in FIG. 39, the biomolecule-refining section 53 can include a biomolecule-collecting liquid introduction inlet 53*b* and a biomolecule-fixing section 53*c*. The biomolecule-refining section 53 can preferably further include a biomolecule-cleaning liquid introduction inlet 53*a*.

In the embodiment, the biomolecule fixed by the biomolecule-fixing section 53*c* can be a miRNA. As the exosome-disrupted liquid passes through the biomolecule-fixing section 53*c*, the biomolecule is captured onto the biomolecule-fixing section 53*c*.

Next, the biomolecule fixed to the biomolecule-fixing section 53*c* is eluted. As shown in FIG. 39, a valve 53*f* of a flow path 53*g* is opened, a biomolecule-collecting liquid is injected into the biomolecule-collecting liquid introduction inlet 53*b*, and the biomolecule-collecting liquid is introduced into the biomolecule-fixing section 53*c*.

Next, the biomolecule is collected from the biomolecule-fixing section 53*c*. The biomolecule is delivered to the biomolecule detection section 54 through the second flow path 56.

As an example, the biomolecule detection section 54 includes a substrate in which a material having compatibility is fixed to the biomolecule. When the biomolecule is the miRNA, the biomolecule detection section 54 can include a substrate 54*c* obtained by fixing a complimentary probe to the target miRNA (see FIG. 39). The substrate in which the complimentary probe is fixed to the target miRNA may be, for example, a DNA chip known in the related art.

As shown in FIG. 39, the biomolecule detection section 54 can further include a cleaning liquid introduction inlet 54*b*.

After the biomolecule is delivered to the biomolecule detection section 54, a valve 54*d* is opened, and a detection probe solution is injected into a detection probe introduction inlet 54*a*.

Next, the biomolecule and the detection probe solution are circulated in the biomolecule detection section and mixed therein.

Next, the substrate to which the capture probe is fixed (the substrate 54c of FIG. 39) is cleaned, and a non-specific adsorbed material on the substrate can be removed.

Next, strength of a marker of a complex formed on the substrate 54c is measured. Since the strength of the marker reflects an abundance of the biomolecule, according to the embodiment, an amount of the biomolecule contained in the sample can be determined.

Measurement of the strength of the marker is performed, for example, by a control unit such as a microscope, a light source, a personal computer, and so on (not shown).

According to the embodiment, analysis of an exosome that requires one day or more in the related art can be rapidly performed in about only one hour.

After the exosome is fixed in the exosome-refining section of the device as described above, the biomolecule present on a surface of the exosome in the exosome-refining section may be detected.

A method of detecting the biomolecule present on the surface of the exosome fixed to the substrate includes forming a complex by interacting the biomolecule present on the surface of the exosome and the first molecule specifically coupled to the biomolecule, and detecting the complex (a first molecule-exosome complex) on the substrate.

The method of detecting the first molecule-exosome complex is a process of detecting, for example, fluorescence of the first molecule-exosome complex at which the fluorescence is marked. In addition, an ELISA detection method may be used.

An example of the interaction between the first molecule and the exosome may be, for example, a binding reaction that is referred to as an antigen-antibody reaction. In addition, the first molecule is not limited to the antibody but an aptamer can also be used. An example of the aptamer may be a nucleic acid aptamer or a peptide aptamer.

As the detection of the biomolecule present on the surface of the above-mentioned exosome and the detection of the miRNA contained in the exosome are performed on the device, the exosome can be analyzed in two steps.

According to the fluid device of the embodiment, as an example, as the exosome in the blood that circulates in the living body is analyzed without the biopsy inspection, abnormality in the living body can be detected.

<<Method of Manufacturing Valve>>

A method of manufacturing a valve according to a fourth aspect of the present invention has a process (a process A) of closing a first end portion of a through-hole opened at a first surface of a substrate using a lid member, a process (a process B) of injecting a raw material of a diaphragm member from a second end portion of the through-hole, a process (a process C) of forming a diaphragm member having at least a central portion formed in a thin film shape and fitted into the first end portion of the through-hole by solidifying the raw material, and a process (a process D) of removing the lid member. Hereinafter, examples of the processes will be described with reference to FIG. 40.

First, the first substrate 10 provided in the process A is prepared. The through-hole 2 passing through the first surface 10a and a second surface 10b is formed in the first substrate 10 used in the example. A first end portion 2a of the through-hole 2 is opened at the first surface 10a, and a second end portion 2b of the through-hole 2 is opened at the second surface 10b. The first end portion 2a opened at the first surface 10a constitutes the opening section 3. The expansion section 3y expanded outward in the radial direction of the through-hole is formed in the opening section 3.

A material that constitutes the first substrate 10 is not particularly limited but, for example, a known material such as a resin (plastic), glass, ceramics, a metal, a semiconductor, or the like, can be applied. As an example, when the valve manufactured in the example is disposed at the micro fluid device, a transparent material such as a resin, glass, or the like, may be used as a substrate material such that the fluid flowing through the device can be seen from the outside.

When the constituent material of the first substrate 10 is acryl resin as an example, a thickness of the first substrate 10 can be, for example, about 0.1 cm to 5.0 cm, or can be, for example, about 0.5 cm to 2.0 cm in view of ease of machining of the through-hole 2 or the like.

A method of forming the through-hole 2 having the above-mentioned configuration such as the expansion section 3y, the depression section 3q, the partition wall 6, the longitudinal hole section 7, the partition wall section 8, the support wall 9, and so on, at the first substrate 10 is not particularly limited; and examples may include a method of cutting a surface of the substrate using a 3D input/output apparatus on public sale.

A hole diameter of the through-hole 2 having the above-mentioned configuration may be appropriately set by a width or a height (a depth) of the flow path in which the valves are disposed, and as an example, can be about 1.0 mm to 10 mm. In addition, while an extent of the expansion of the expansion section 3y is not particularly limited, as an example, the extent of the expansion can be about 1.0 mm to 5.0 mm outward in the radial direction of the through-hole 2.

Next, the prepared first substrate 10 is provided in the process A. As shown in FIG. 40, as the first surface 10a of the first substrate 10 is directed downward and a lid member F is adhered to the first surface 10a to cover the first end portion 2a (the opening section 3) of the through-hole 2 opened to the first surface 10a, the first end portion 2a is closed by the lid member F. Further, a cross-sectional view shown in FIG. 40 only shows a portion including one through-hole 2 and does not show the entire extent of the first substrate 10.

The lid member F is not particularly limited as long as the member can close the first end portion 2a of the through-hole 2 and can be removed in a post process. As an example of the lid member F, a mold-releasing film formed of a resin can be applied. As the mold-releasing film is adhered to the entire surface of the first surface 10a of the first substrate 10, the first end portions 2a of the plurality of through-holes 2 can be temporarily closed.

Next, in the process B, a raw material 4m of the diaphragm member 4 is injected from the second end portion 2b of the through-hole 2. A constituent material of the diaphragm member 4 may be a material that is deformable in the axial direction of the through-hole 2 according to a variation in pressure in the through-hole 2 and, for example, an elastomer.

The elastomer can be a material formed of a known high-molecular-weight compound. An example of an elastomer material that constitutes the diaphragm member 4 may be PDMS.

A thickness of the thin film-shaped central portion 4p of the diaphragm member 4 is not particularly limited as long as the central portion can be deformed in the axial direction of the through-hole 2 with an appropriate pressure, and may be set according to the kind or property of the constituent material of the diaphragm member 4. As an example, when the PDMS is the constituent material of the diaphragm member 4, a thickness of the central portion 4p can be, for example, about 1 μm to 1,000 μm. When the thickness is within the range, the central portion can be sufficiently deformed by a relatively small variation in pressure.

The thickness of the thin film-shaped outer edge section 4q of the diaphragm member 4 is not particularly limited but can be larger than that of the central portion 4p. For example, a thickness of the outer edge section 4q at a place adhered to the inner wall surface of the opening section 3 can be about 1.5 to 5.0 times a thickness of a thinnest place of the central portion 4p.

As an injection volume of the raw material 4m of the diaphragm member 4 is adjusted, the thickness of the diaphragm member 4 can be adjusted. The injection method is not particularly limited but may be, for example, as shown in FIG. 40, a method of disposing a nozzle of a dispenser D over the second end portion of the through-hole 2 and injecting the raw material 4m in a liquid phase before curing. The raw material 4m in the liquid phase naturally expands on the surface of the lid member F and the inner wall surface of the opening section 3 by the adhesion force and surface tension thereof. The flow of the raw material 4m is converged when a certain time elapses after injection, and as shown in FIG. 40, a meniscus having a parabolic surface convex with respect to the first surface 10a is formed. In order to form the above-mentioned meniscus, the adhesion force between the raw material 4m and the inner wall surface of the opening section 3 can be increased, and in order to increase the adhesion force, surface treatment known in the art may be performed on the inner wall surface in advance.

In the process C, as the raw material 4m in which the meniscus is formed is cured, the diaphragm member 4 in which the shape of the meniscus is fixed can be formed. The method of curing the raw material 4m is not particularly limited but, for example, a conventional method such as heating, ultraviolet light radiation, or the like, can be applied according to properties of the raw material 4m used therein. In addition, for example, the raw material 4m can be naturally cured when a certain time elapses after injection as long as the raw material 4m is a two-liquid mixing type resin composition in which a main agent and a crosslinking agent (a hardening agent) are mixed.

After formation of the diaphragm member 4, in the process D, as the lid member F is removed, the substrate in which the desired valve is formed can be obtained. For example, when the lid member F is a known mold-releasing film adhered to the first surface 10a of the substrate, the lid member F can be simply exfoliated and removed.

<Injection of Raw Material 4m of Diaphragm Member 4 into Longitudinal Hole Section 7>

In the process B, a case in which the raw material 4m of the diaphragm member 4 is injected into the through-hole 2 that constitutes the valve of the above-mentioned seventh embodiment will be exemplarily described as follows.

FIG. 41 is a perspective view showing the through-hole 2 that constitutes the valve of the seventh embodiment when seen from the second end portion 2b side, corresponding to a view in which positive and negative sides of the Z-axis direction of the perspective view of FIG. 26 are reversed.

In FIG. 41, the lid member F (in the drawings, the plane of the drawing corresponds to the first surface 10a and the lid member F) is adhered to the first surface 10a of the first substrate 10, and the first end portion 2a (the opening section 3) of the through-hole 2 is covered and closed by the lid member F. The state is a step in which the process A is terminated. Next, in the process B, when the raw material 4m of the diaphragm member 4 is injected from the second end portion 2b side of the through-hole 2, the raw material 4m is spread on the lid member F in the opening section 3, passes through the peripheral edge portion 2z of the through-hole 2 and flows into the longitudinal hole section 7. The aspect is shown in a cross-sectional view of FIG. 42.

The cross-sectional view of FIG. 42 shows a cross-section including two opposite longitudinal hole sections 7 and the axis of the through-hole 2 in FIG. 41. In the drawing, an arrow a represents that the raw material 4m is injected from the second end portion 2b side of the through-hole 2. The raw material 4m injected in this way is spread on the lid member F in the opening section 3, passes the vicinity of the peripheral edge portion 2z of the through-hole 2, and flows into the longitudinal hole section 7. While a space of the longitudinal hole section 7 extends upward (a positive direction of the Z-axis), the raw material 4m naturally rises through the longitudinal hole section 7 against gravity by the adhesion force and a capillary phenomenon with respect to the wall surfaces that constitute the longitudinal hole section 7. Here, according to the rise of the raw material 4m, the air in the longitudinal hole section 7 escapes from an opening section 7c of the longitudinal hole section 7 opened at the second surface side of the first substrate 10 (an arrow β of FIG. 42 represents an escape of the air). For this reason, the raw material 4m can rise in the longitudinal hole section 7 to arrive at a predetermined height at which gravity, the adhesion force and the capillary phenomenon are balanced, and the rise is not prevented by the air in the longitudinal hole section 7. Further, as the pressure of the air or the like upon injection of the raw material 4m is applied to the through-hole 2 in a direction of the arrow a, the raw material 4m may be actively pushed into the longitudinal hole section 7.

As described above, even in the longitudinal hole section 7 having a relatively complex shape, the raw material 4m can be injected, and the outer edge section 4q of the diaphragm member 4 can be formed in the longitudinal hole section 7.

Hereinafter, while the present invention is described by examples, the present invention is not limited to the following examples.

EXAMPLE

Example 1

The valve 1 of the seventh embodiment shown in FIG. 28 was manufactured as follows.

First, a plastic plate (manufactured by Japan Acryace Corporation, Product name: Acryace MS) having a thickness of 5 mm was prepared as the first substrate 10. Cutting was performed from both surfaces of the first substrate 10 to form the through-hole 2 having the configuration shown in FIGS. 26 and 27. The cutting was performed using a 3D input/output apparatus (manufactured by Roland DG Co., Ltd., Model No.: MDX-540S).

After cutting, the first substrate 10 was immersed in ethanol, ultrasonic cleaning was performed for 1 minute, and the first substrate 10 was immersed in ultra pure water to be cleaned for 1 minute. After that, the first substrate 10 was dried by airflow.

A film formed of acryl resin was laminated on the first surface 10a of the first substrate 10. The film was heated to 125° C. using a laminator (manufactured by Taisei Laminator Co., Ltd., Model No.: VA-400), and the film was adhered to the first surface 10a to cover and close the opening section 3 opened to the first surface 10a.

Next, oxygen plasma was radiated from the second surface of the first substrate 10 to the wall surfaces that constitute the opening section 3 and the longitudinal hole section 7 in the through-hole 2 and the inner surface of the laminated film that closes the opening section 3 to hydrophilize the wall surfaces and the inner surface. Conditions of the oxygen plasma radiation of the apparatus (manufactured by Yamato Scientific Co., Ltd., Model No.: PDC210) used in the surface treatment were oxygen of 30 cc, an output of 100W, and a radiation time of 1 minute.

A predetermined amount of PDMS (manufactured by Toray Dow Corning Co., Ltd.) containing a crosslinking agent was injected into the through-hole 2, which was surface-treated, from the second surface side of the first substrate 10 using a dispenser (manufactured by Musashi Engineering Co., Ltd., Model No.: SMP-III).

A mixed ratio of the PDMS and the crosslinking agent was adjusted within a range of PDMS: crosslinking agent=15:1 to 20:1 (a volume ratio). An injection volume of the PDMS was adjusted within a range of about 30 μL to 50 μL such that a formed thickness of the central portion 4p of the diaphragm member 4 was about 500 μm.

After the PDMS was injected to a predetermined amount from the dispenser, when the PDMS had risen through the longitudinal hole section 7 and the rise had stopped for about 5 minutes, the PDMS was risen to a height of about 5 mm from the first surface 10a of the first substrate 10 to which the laminated film was adhered. In addition, the thickness of the PDMS that formed the central portion 4p of the diaphragm member 4 spread on the laminated film was about 500 μm, and a meniscus in which the central portion 4p had a parabolic surface shape that was convex with respect to the laminated film was naturally formed (see FIGS. 30 and 42).

The first substrate 10 was placed in an oven that was heated to 80° C. for 30 minutes or more in a state in which the flow of the PDMS was converged to form the meniscus, and the PDMS was cured. Here, the PDMS was cured in a state in which the shape of the meniscus was maintained. After that, as the laminated film that was heated to be easily exfoliated was removed from the first substrate 10a, the first substrate 10 (see FIG. 28) in which the desired the valve 1 was formed was obtained.

Since the shape of the valve 1 was designed such that the air blown into the through-hole 2 was applied to only the central portion 4p of the diaphragm member 4 to operate the valve, a pressure-resistant limit was improved. As a result of performing an operation test of the valve to estimate the withstanding pressure performance, it was confirmed that the central portion 4p of the diaphragm member 4 can be expanded in the axial direction of the through-hole 2 (a direction perpendicular to the axis of the flow path 21) at a pressure of about 0.2 MPa to 0.35 MPa, there was no damage even when the operation was repeated, and good durability was provided.

What is claimed is:

1. A valve disposed at a flow path, the valve comprising:
a substrate having a first surface in which a hole having an opening section is formed; and
a diaphragm member fixed to at least a part of a wall surface of the hole and in which at least a central portion has a thin film shape, the diaphragm member configured to have a closed position at which the diaphragm member closes the flow path and an open position at which the diaphragm member opens the flow path,
wherein the first surface of the substrate faces the flow path, a first surface of the diaphragm member faces the flow path and is a plane substantially parallel to and flush with the first surface of the substrate when the diaphragm member is at the open position, and a flow of a fluid in the flow path is controlled by deforming the diaphragm member to move between the open position and the closed position.

2. The valve according to claim 1, wherein
the first surface of the substrate is a fluid contact surface, and the diaphragm member controls the flow of the fluid in the flow path by deforming in a direction perpendicular to an axis of the flow path.

3. The valve according to claim 1, wherein
the diaphragm member is disposed at the opening section side of the hole.

4. The valve according to claim 1, wherein
a thickness of an outer edge section of the diaphragm member in contact with the wall surface of the hole is larger than that of the central portion of the diaphragm member.

5. The valve according to claim 1, wherein
at least a central portion of a second surface of the diaphragm member opposite to the first surface of the diaphragm member has a recessed concave shape.

6. The valve according to claim 1, wherein
in a cross-section in a thickness direction of the substrate,
a first side of the diaphragm member facing the flow path is a straight line substantially parallel to a first side that constitutes the first surface of the substrate, and
at least a central portion of a second side of the diaphragm member opposite to the first side of the diaphragm member has a concave shape that approaches the opposite first side.

7. The valve according to claim 1, wherein
the diaphragm member is an elastomer.

8. The valve according to claim 1, wherein
the hole is a through-hole,
the diaphragm member is fixed to one end side in the through-hole, and
the hole configures a space through which an external force passes from the other end side of the through-hole toward the diaphragm member.

9. The valve according to claim 1, wherein
the hole has a step section formed to extend at the wall surface, and
the diaphragm member is fixed to at least the wall surface in a bottom surface and the wall surface of the step section.

10. The valve according to claim 1, wherein
an inner wall surface that constitutes the opening section is expanded outward in a radial direction of the hole, and
an inner diameter of the opening section is larger than that of the hole further inside of the opening section.

11. The valve according to claim 1, wherein
a throttling section having a lateral cross-sectional area cut in the radial direction smaller than another portion of the opening section is formed in an inner wall surface that constitutes an end portion of the opening section.

12. The valve according to claim 1, wherein
one or more concave sections expanded outward in the radial direction of the hole are formed in an inner wall surface that constitutes the opening section,
an outer edge section of the diaphragm member is formed to extend in the concave section, and the inner wall surface that constitutes the concave section and the outer edge section of the diaphragm member are at least partially adhered to each other.

13. The valve according to claim 12, wherein
the plurality of concave sections are formed, and each of the concave sections is disposed point-symmetrically with respect to each other about the hole.

14. The valve according to claim 12, wherein
the plurality of concave sections are formed, an end portion facing the first surface of the substrate in a partition wall that separates the neighboring concave sections is disposed further inside than the first surface of the substrate, and the neighboring concave sections are spatially connected to each other in the vicinity of the end portion of the partition wall.

15. The valve according to claim 1, wherein
an expansion section in which an end portion of an inner wall surface that constitutes the opening section is expanded outward in the radial direction of the hole is formed,
a longitudinal hole section in which at least a part of the expansion section except for a peripheral edge portion of the hole enters further inside the substrate than the peripheral edge portion is formed,
the outer edge section of the diaphragm member is formed to extend in the longitudinal hole section, and
the inner wall surface that constitutes the opening section and the outer edge section of the diaphragm member are at least partially adhered to each other.

16. The valve according to claim 15, wherein
a first end portion of the longitudinal hole section is opened at the expansion section, and a second end portion of the longitudinal hole section is freely exposed to the atmosphere.

17. The valve according to claim 1, wherein
at least a central portion of the diaphragm member is exposed to the first surface of the substrate and is disposed at an area that constitutes the flow path.

* * * * *